US010847104B2

United States Patent
Kasuo et al.

(10) Patent No.: US 10,847,104 B2
(45) Date of Patent: Nov. 24, 2020

(54) DOT MATRIX DISPLAY DEVICE AND TIME DISPLAY DEVICE

(71) Applicants: CASIO COMPUTER CO., LTD., Tokyo (JP); KYOCERA Corporation, Kyoto (JP)

(72) Inventors: Tomoo Kasuo, Hamura (JP); Eiji Yamakawa, Tama (JP); Takanobu Suzuki, Itami (JP)

(73) Assignee: Kyocera Corporation, Kyoto (JP)

( * ) Notice: Subject to any disclaimer, the term of this patent is extended or adjusted under 35 U.S.C. 154(b) by 181 days.

(21) Appl. No.: 16/089,638

(22) PCT Filed: Feb. 24, 2017

(86) PCT No.: PCT/JP2017/007257
§ 371 (c)(1),
(2) Date: Sep. 28, 2018

(87) PCT Pub. No.: WO2017/169406
PCT Pub. Date: Oct. 5, 2017

(65) Prior Publication Data
US 2020/0302886 A1    Sep. 24, 2020

(30) Foreign Application Priority Data

Mar. 31, 2016    (JP) .................................. 2016-073106

(51) Int. Cl.
*G09G 3/36*    (2006.01)

(52) U.S. Cl.
CPC ....... *G09G 3/3648* (2013.01); *G09G 2310/08* (2013.01)

(58) Field of Classification Search
CPC ....... G09G 2310/0213; G09G 2310/04; G09G 2330/021; G09G 5/363; G09G 5/393; G09G 5/18; G09G 3/3648
See application file for complete search history.

(56) References Cited

U.S. PATENT DOCUMENTS

2002/0011998 A1 *   1/2002   Tamura .................. G06F 3/147
                                                345/204
2002/0018058 A1 *   2/2002   Tamura .................. G09G 5/006
                                                345/204

(Continued)

FOREIGN PATENT DOCUMENTS

JP   2002-175040 A    6/2002
JP   2003-099018 A    4/2003
JP   2015-087437 A    5/2015

*Primary Examiner* — Dong Hui Liang
(74) *Attorney, Agent, or Firm* — Volpe Koenig

(57) ABSTRACT

A dot matrix display device includes a pixel redraw control unit and a decoder unit. The pixel redraw control unit generates a gate selection signal identifying an address in one direction, a source selection signal identifying an address in another direction intersecting the one direction, and image data which correspond to a pixel electrode part based on a serial signal including an address signal identifying an address of the pixel electrode part and an image signal supplied to the pixel electrode part. The decoder unit supplies a gate signal which activates a gate signal line corresponding to the pixel electrode part based on the gate selection signal, generates a source signal which activates a source signal line corresponding to the pixel electrode part based on the source selection signal, and supplies the image data to the pixel electrode part corresponding to the activated source signal line.

9 Claims, 19 Drawing Sheets

(56) References Cited

U.S. PATENT DOCUMENTS

| | | | |
|---|---|---|---|
| 2003/0006977 A1 | 1/2003 | Hanari et al. | |
| 2003/0122773 A1* | 7/2003 | Washio | G09G 3/3688 345/103 |
| 2007/0291021 A1* | 12/2007 | Awakura | G09G 3/3648 345/205 |
| 2010/0128019 A1* | 5/2010 | Harada | G09G 3/3611 345/212 |

* cited by examiner

FIG. 9

| data(B) | Vcom(A) | Pixel(Y) |
|---|---|---|
| 3V(H:1) | 3V(H:1) | 0V(L:0) |
| 3V(H:1) | 0V(L:0) | 3V(H:1) |
| 0V(L:0) | 3V(H:1) | 3V(H:1) |
| 0V(L:0) | 0V(L:0) | 0V(L:0) |

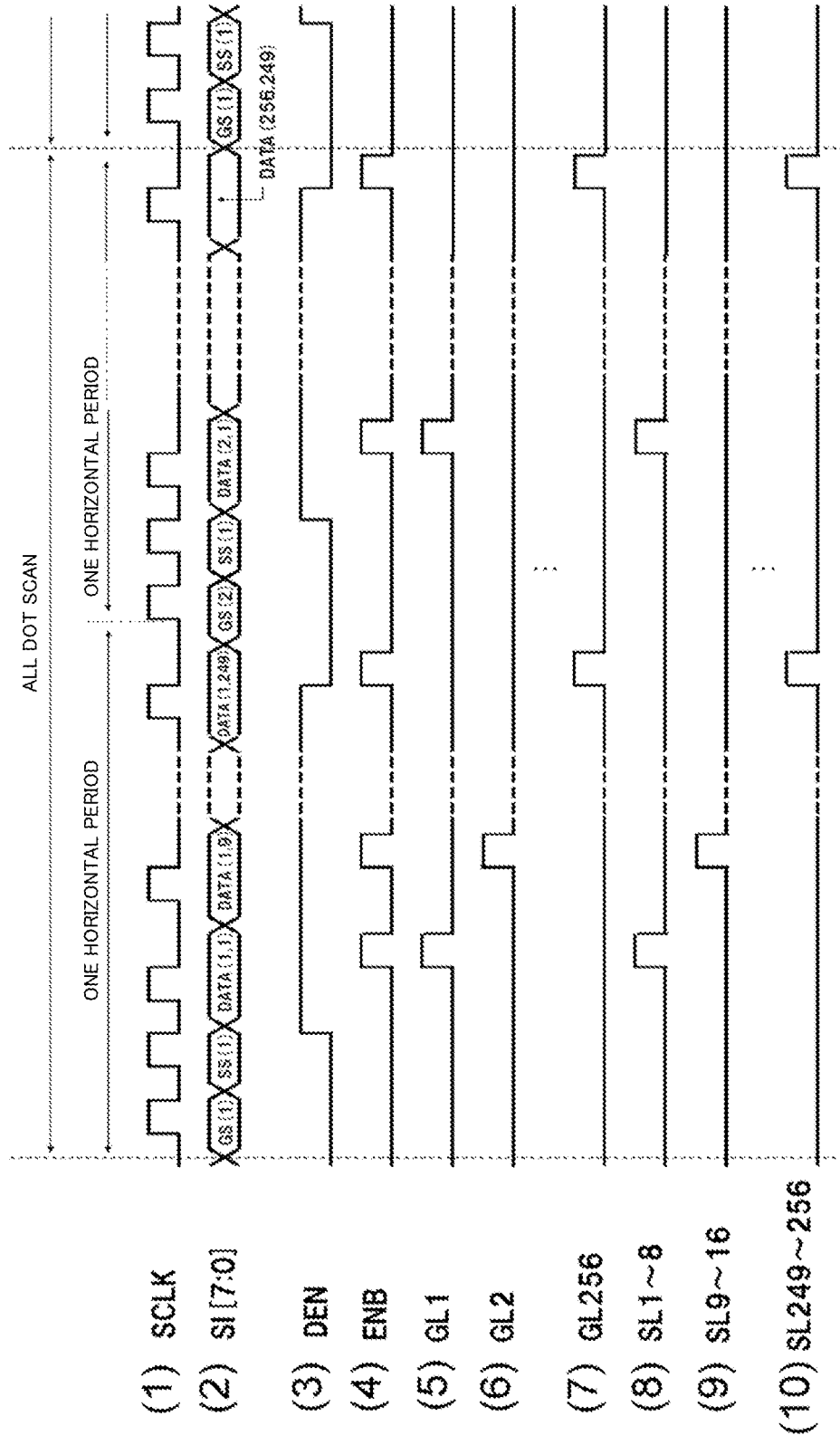

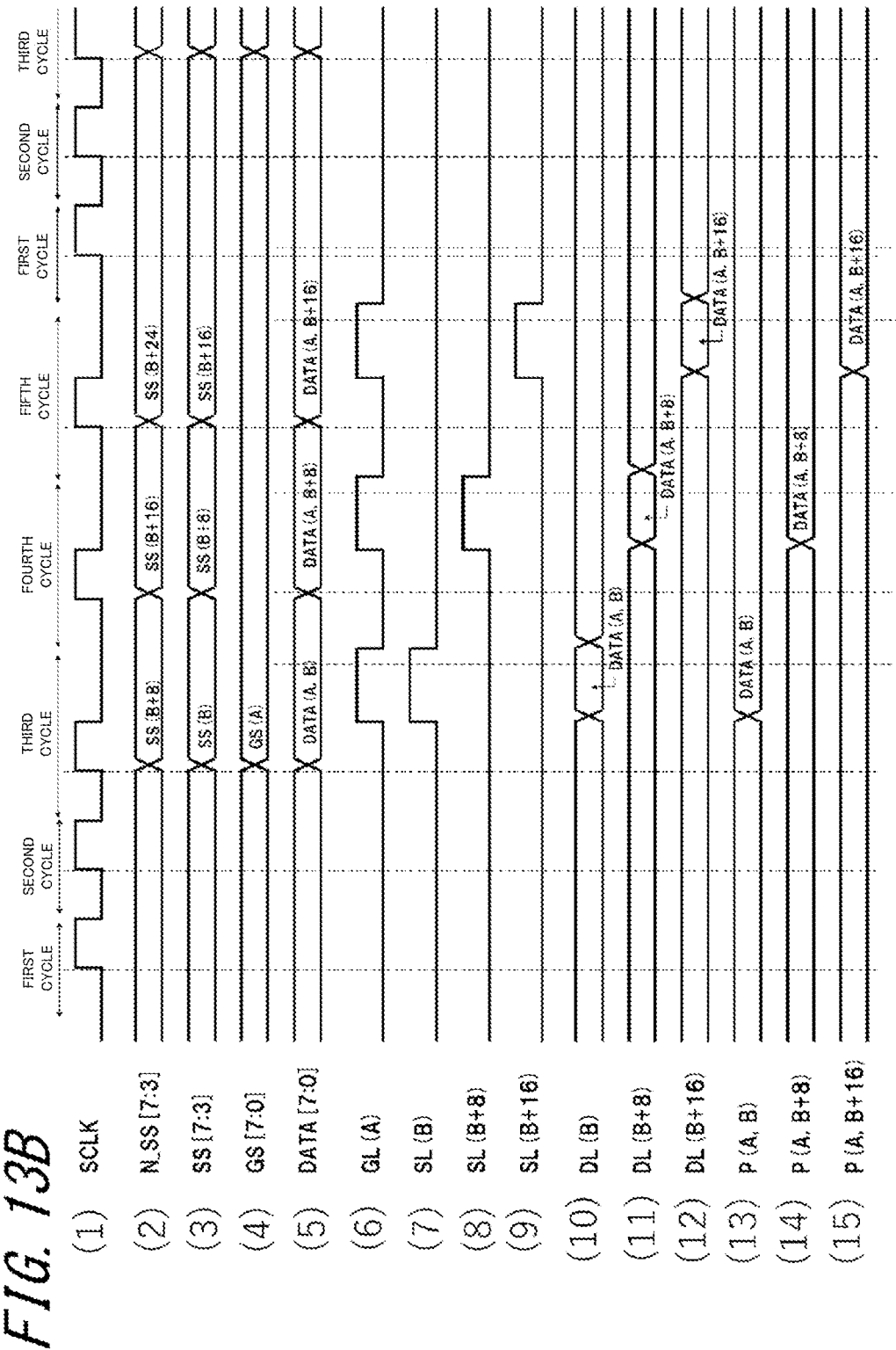

DOT MATRIX DISPLAY DEVICE AND TIME DISPLAY DEVICE

TECHNICAL FIELD

The present invention relates to a dot matrix display device and a time display device in which many pixel electrode parts including thin-film transistor (TFT) elements are formed on a substrate.

BACKGROUND ART

Various types of dot matrix display devices have been manufactured conventionally. For example, a liquid crystal display (LCD) is manufactured by bonding a TFT array side substrate on which many pixel electrode parts including TFT elements are formed and a color filter side substrate on which color filters and a black matrix are formed together so as to face each other with a predetermined clearance left therebetween and filling the clearance with liquid crystal in a close-packed manner.

The structure of a conventional dot matrix display device will be described (see, for example, Patent Literature 1). FIG. 14 is a block circuit diagram illustrating the basic structure of a conventional dot matrix display device. FIG. 14 illustrates the structure of a monochrome LCD panel 111 having 65536 dots (pixels) (256 dots in the vertical direction×256 dots in the horizontal direction). In FIG. 14, a gate signal line driving circuit 103 is disposed on one side of the LCD panel 111 and an image signal (source signal) line driving circuit 104 is disposed on the lower side of the LCD panel 111. As illustrated in FIG. 14, each of pixel electrode parts 100 (P11 to Pmn) of a display unit 110 has two TFT elements 101 for selecting the pixel electrode part. Common voltage lines 102 through which a common voltage Vcom is supplied, gate signal lines 1 (GL1 to GL256) through which a signal (gate signal) for selecting the gate signal lines is supplied, source signal lines 2 (DL1 to DL256) through which image data is supplied, and source signal line selection lines 3 (SL1 to SL256) through which a signal (source signal) for selecting the source signal lines 2 is supplied are connected to the individual pixel electrode parts 100.

Here, the TFT element 101 has a semiconductor film formed of, for example, amorphous silicon (a-Si) or the like and has three terminal parts: a gate electrode part, a source electrode part, and a drain electrode part. Then, the TFT element 101 functions as a switching device (gate transfer device) that feeds a current through the semiconductor film (channel) between the source electrode part and the drain electrode part by applying a voltage (for example, 3 V or 6 V) having a predetermined potential. In addition, the pixel electrode part 100 is generally formed by a transparent conductive layer generally formed of indium tin oxide (ITO) or the like.

In addition, the color filter side substrate has red (R), green (G), and blue (B) color filters corresponding to individual pixels and a black matrix that prevents mutual interference of light passing through the individual pixels is formed so as to surround the outer periphery of the color filters on the surface on which the common electrode and the common voltage line are formed or the opposite surface thereof. It should be noted that the color filters and the black matrix are formed only when color display is performed. In addition, a transmissive LCD is provided with a backlight, but a reflective LCD is not provided with a backlight.

FIG. 15A and FIG. 15B are timing charts schematically illustrating the operation of the conventional dot matrix display device. First, the gate signal line driving circuit 103 receives a vertical sync signal STV indicating the start timing of one frame and a horizontal sync signal STH for each horizontal period. Then, the gate signal line driving circuit 103 generates a signal for selecting the gate signal line GL1 of the first line based on the gate selection signal received from an external device (not illustrated) and activates the gate signal line GL1 (from L to H). Concurrently with this, the gate signal line driving circuit 103 activates the source signal line selection lines SL1 to SL8 so as to enable display of the first eight pixels (update of the image data of the eight pixels) in the first line. With this, the source signal line driving circuit 104 supplies image data (DATA (1, 1)) corresponding to the eight pixel electrode parts 100 (P (1, 1) to P (1, 8)) in the first line to the source signal lines DL1 to DL8. With this the pixel data is supplied to the eight pixel electrode parts 100 (P (1, 1) to P (1, 8)) via the corresponding source signal lines DL1 to DL8.

After that, the source signal line selection lines SL9 to SL16 are activated similarly for the next right eight pixel electrode parts 100 (P (1, 9) to P (1, 16)), the image data DATA (1, 9) is captured, and the image data is also supplied to the pixel electrode parts 100 (P (1, 9) to P (1, 16)). The pixel data is supplied to all of the pixel electrode parts 100 in the first line in this way, the same control is performed on the pixel electrode parts 100 in the next lower line sequentially, and one frame of pixel data is supplied.

CITATION LIST

Patent Literature

Patent Literature 1: Japanese Unexamined Patent Publication JP-A 2015-87437

SUMMARY OF INVENTION

Technical Problem

However, the following problem is present in the conventional dot matrix display device having the structure described above. That is, since a vertical address signal for selecting a gate signal line GLn to be put in an on-state, a horizontal address signal for selecting a source signal line selection line SLn to be put in the on-state, and an image signal (image data) to be inputted to the pixel electrode part 100 to be selected are inputted to the LCD panel 111 in parallel, the number of terminals through which the individual signals are inputted/outputted is large and the wiring structure becomes complicated. That is, since gate selection signals GS[7:0] are inputted to the gate signal line driving circuit 103 and source selection signals SS[7:3] and image data DATA[7:0] are inputted to the source signal line driving circuit 104 in parallel from an external signal supply unit 120 as illustrated in FIG. 14, eight wires for the gate selection signals GS[7:0], five wires for the source selection signals SS[7:3], and eight wires for the image data DATA [7:0] need to be routed in the peripheral part of the LCD panel 111.

Although the vertical address signal, the horizontal address signal, and the image signal may be inputted to the LCD panel 111 in series (serially) to solve such a problem, this structure takes much time to transfer the signals, consequently the operation speed decelerates.

Accordingly, the invention has been accomplished in view of the conventional problem described above, and an object thereof is to provide a dot matrix display device and a time display device which enable display in which still picture display is combined with motion picture display at extremely low power consumption and to provide a dot matrix display device and time display device which can simplify the wiring structure and reduce the transfer time of signals by reducing the number of terminals through which the signals are inputted.

Solution to Problem

The invention provides a dot matrix display device including a plurality of gate signal lines disposed in one direction; a plurality of source signal lines disposed in another direction intersecting the one direction; a display unit having a plurality of pixel electrode parts disposed in a matrix, the plurality of pixel electrode parts controlling display, apart of the plurality of pixel electrode parts being selected based on the gate signal lines and the source signal lines; a pixel redraw control unit which generates gate selection signals identifying addresses in the one direction, source selection signals identifying addresses in the direction intersecting the one direction, and image data which correspond to one or more of the pixel electrode parts based on a serial signal including address signals identifying addresses of the one or more of the pixel electrode parts and image signals supplied to the one or more of the pixel electrode parts; and a decoder unit which generates agate signal which activates the gate signal lines corresponding to the one or more of the pixel electrode parts based on the gate selection signals generated by the pixel redraw control unit, generates a source signal which activates the source signal lines corresponding to the one or more of the pixel electrode parts based on the source selection signals generated by the pixel redraw control unit, and supplies the image data generated by the pixel redraw control unit to the pixel electrode parts corresponding to the activated source signal lines.

In addition, in the dot matrix display device according to the invention, it is preferable that the dot matrix display device further includes a signal supply unit which generates the serial signal including the address signal and the image signal based on a video signal supplied from an outside and a control signal defining timing concerning processing of the image signal in the serial signal and outputs the serial signal and the control signal to the pixel redraw control unit.

In addition, in the invention, it is preferable that the signal supply unit generates only a serial signal concerning the one or more of the pixel electrode parts on which redraw driving of the image data is executed based on the video signal and outputs the generated serial signal to the pixel redraw control unit.

In addition, in the invention, it is preferable that the pixel redraw control unit includes an address computation circuit which generates the gate selection signals and the source selection signals corresponding to the one or more of the pixel electrode parts based on the serial signal and the control signal inputted from the signal supply unit, and a data register circuit which generates the image data to be supplied to the one or more of the pixel electrode parts based on the serial signal and the control signal inputted from the signal supply unit.

In addition, in the invention, it is preferable that each of the pixel electrode parts includes a holding circuit which holds the supplied image data and a drive selection circuit which selects executing either redraw driving or still picture driving based on the generated gate signals and the generated source signals, and the image data in the holding circuit is redrawn using the supplied image data when the redraw driving is selected, and the image data held in the holding circuit continues to be held when the still picture driving is selected.

In addition, in the invention, it is preferable that if the pixel electrode parts on which redraw driving is executed are continuous in the one direction, the address computation circuit generates the source selection signals corresponding to the plurality of pixel electrode parts based on one source address signal.

In addition, in the invention, it is preferable that if the pixel electrode parts on which redraw driving is executed are continuous in the direction intersecting the one direction, the address computation circuit generates the gate selection signals corresponding to the plurality of pixel electrode parts based on one gate address signal.

In addition, in the invention, it is preferable that if the pixel electrode parts on which redraw driving is executed are continuous in the one direction and the direction intersecting the one direction, the address computation circuit generates the source selection signals and the gate selection signals corresponding to the plurality of pixel electrode parts based on one source address signal and one gate address signal, respectively.

In addition, the invention provides a time display device including the dot matrix display device mentioned above; and a clock control unit which clocks time, generates at least a video signal concerning display of clocked time, and outputs the video signal to the signal supply unit.

Advantageous Effects of Invention

The dot matrix display device according to the invention has the following effects.

That is, in the dot matrix display device according to the invention, the pixel redraw control unit does not input the image data to the pixel electrode part for which still picture driving is selected and the pixel electrode part for which still picture driving is selected undergoes still picture driving using the image data held in the holding circuit, so display in which still picture display is combined with motion picture display can be performed at extremely low power consumption. In addition, the pixel redraw control unit includes an input part to which the gate address signal, the source address signal, and the image signal are inputted serially, the wiring structure can be simplified by reducing the number of terminals through which the signals are inputted. In addition, since the pixel redraw control unit includes an output part through which the gate selection signals, the source selection signals, and the image data are outputted in parallel, the transfer time of these signals can be kept short.

In addition, in the dot matrix display device according to the invention, when the pixel electrode parts on which redraw driving is executed are continuous in one direction, if the address computation circuit generates the source selection signals to be outputted to the plurality of pixel electrode parts based on the source address signal, since only one source address signal needs to be serially inputted to the pixel redraw control unit even though redraw driving is executed on the plurality of pixel electrode parts, the transfer time of the signals can be reduced.

In addition, in the dot matrix display device according to the invention, when the pixel electrode parts on which redraw driving is executed are continuous in another direction intersecting one direction, if the address computation circuit generates the gate selection signals to be outputted to the plurality of pixel electrode parts based on the gate address signal, since only one gate address signal needs to be serially inputted to the pixel redraw control unit even though redraw driving is executed on the plurality of pixel electrode parts, the transfer time of the signals can be reduced.

In addition, in the dot matrix display device according to the invention, when the pixel electrode parts on which redraw driving is executed are continuous in one direction and the direction intersecting one direction, if the address computation circuit generates the gate selection signals and the source selection signals to be outputted to the plurality of pixel electrode parts based on the gate address signal and the source address signal, since only one gate address signal and only one source address signal need to be serially inputted to the pixel redraw control unit even though redraw driving is executed on the plurality of pixel electrode parts, the transfer time of the signals can be reduced.

In addition, since the time display device according to the invention includes the dot matrix display device described above, display in which still picture display is combined with motion picture display can be achieved at extremely low power consumption and the transfer time of these signals can be kept short because the wiring structure is simplified by reducing the number of terminals through which the signals are inputted.

BRIEF DESCRIPTION OF DRAWINGS

The objects, features, and advantages of the invention will be clarified from the following detailed description and drawings.

FIG. 9 is a truth table listing the common voltage Vcom (A) and image signal data (B) as binary inputs and the output (Y) of an exclusive OR logic gate circuit in the pixel electrode control circuit of the dot matrix display device;

FIG. 11A is a part of a timing chart used to describe the entire operation of the dot matrix display device according to the invention;

FIG. 13B is a part of a timing chart used to describe the operation of a dot matrix display device according to a second embodiment of the invention, which corresponds to FIG. 13A;

DESCRIPTION OF EMBODIMENTS

Figure 1:
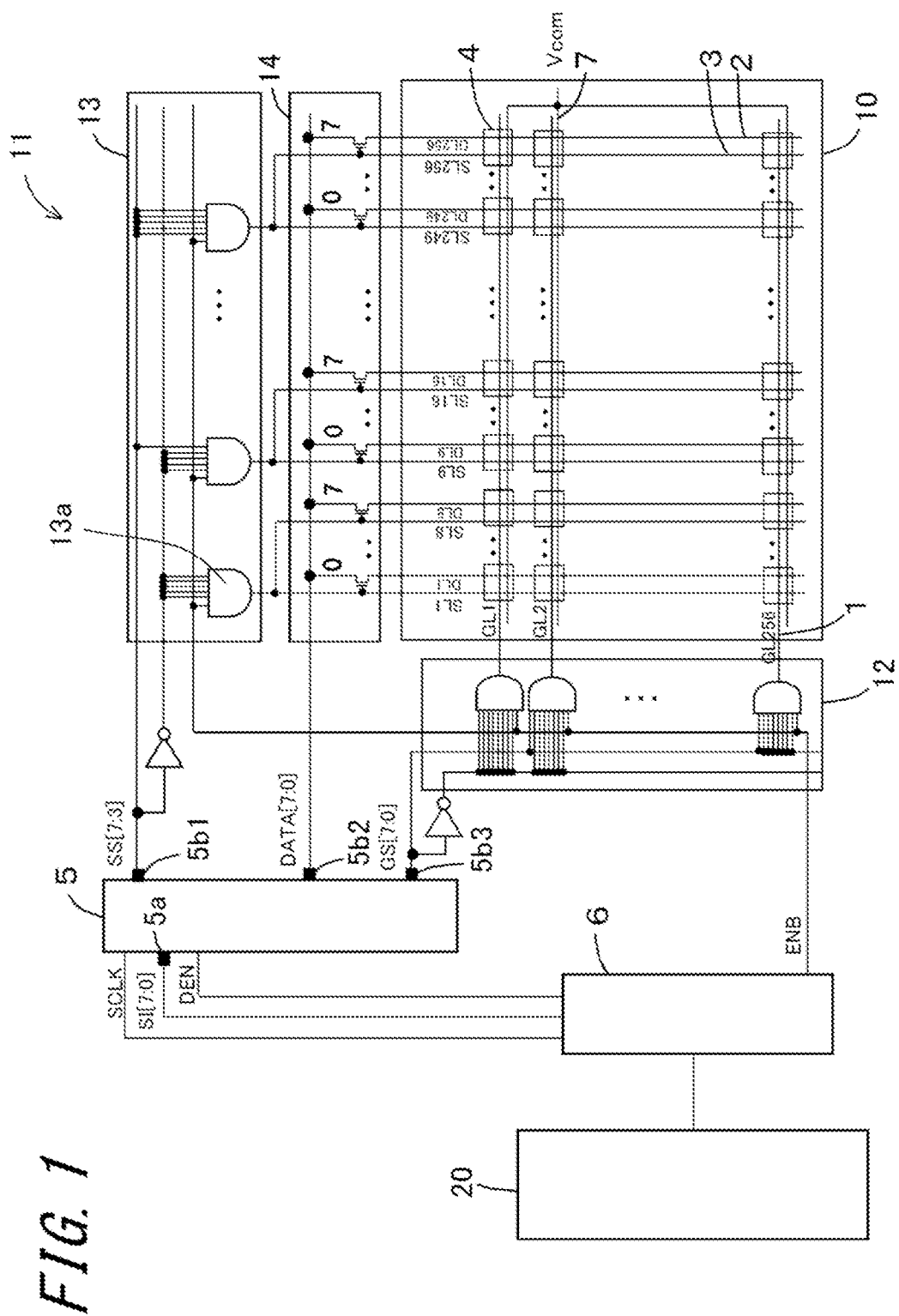
FIG. 1 is a block circuit diagram illustrating an example of the structure of a dot matrix display device according to the invention.

The dot matrix display devices according to the embodiments of the invention will be described below with reference to the drawings. However, the drawings to be referenced below illustrate main structural members required to describe the features of the invention among the structural members of the dot matrix display device according to the invention. Accordingly, the dot matrix display device according to the invention may include well-known structural members such as a wiring conductor, a circuit board, a control IC, or a control LSI which are not illustrated in the drawings.

First Embodiment

A dot matrix display device 11 according to the embodiment will be described with reference to FIG. 1 to FIG. 13B. FIG. 1 is a block circuit diagram illustrating the entire structure of the dot matrix display device 11. FIG. 1 illustrates an example of the structure of the dot matrix display device 11 provided with a monochrome display unit 10 having 65536 dots (pixels) (256 dots in the vertical direction×256 dots in the horizontal direction).

As illustrated in FIG. 1, the dot matrix display device 11 according to the embodiment includes a signal supply unit 6, a pixel redraw control unit 5, the display unit 10 including pixel electrode parts 4 which are disposed in a matrix and includes holding circuits (memories), a gate decoder circuit 12 which generates a gate signal for selecting the gate signal lines 1 (GL1 to GL256) (in the on-state) arranged in another direction intersecting one direction (for example, the direction from the top to the bottom in FIG. 1), a source decoder circuit 13 which generates a source signal for selecting the source signal line selection lines 3 (in the on-state) arranged in one direction (for example, the direction from the left to the right in FIG. 1), and a source signal line selector circuit 14 that selectively supplies the image data DATA[7:0] to the source signal lines 2 (DL1 to DL256). It should be noted that the gate decoder circuit 12, the source decoder circuit 13, and the source signal line selector circuit 14 are examples of decoder units. Details will be described below.

The signal supply unit 6 generates a serial signal SI[7:0], a shift clock signal SCLK, a data identification signal DEN, and an enable signal ENB based on a video signal, a synchronization signal, a clock signal, and the like inputted from an external device such as a TV receiver or a personal computer and outputs the generated signals to the pixel redraw control unit 5, or to the gate decoder circuit 12 and the source decoder circuit 13. Here, the serial signal SI[7:0] outputted to the pixel redraw control unit 5 is a serial structure signal including the gate address signal, the source address signal, and the image signal. In specific examples of the serial signal SI[7:0], when the gate signal line GL1 and the source signal line selection lines SL1 to SL8 are selected and data "1" is written to all of the source signal lines DL1 to DL8, the input data from the first cycle to the third cycle of the serial signal SI[7:0] equals ooh, ooh, and FFh.

The pixel redraw control unit 5 is one of characteristic components of the invention and extracts or generates the gate selection signals GS[7:0], the source selection signals SS[7:3], and the image data DATA[7:0] that are required to control the pixel electrode parts 4 disposed in a matrix in the display unit 10, from the serial signal SI[7:0] inputted from the signal supply unit 6. Specifically, the pixel redraw control unit 5 extracts or generates the gate selection signals GS[7:0] for selecting the gate signal lines 1, from the gate address signal of the serial signal SI[7:0]. Similarly, the pixel redraw control unit 5 extracts or generates the source selection signals SS[7:3] for selecting the source signal line selection lines 3 from the source address signal of the serial signal SI[7:0] and extracts or generates the image data DATA[7:0] to be inputted to the source signal lines 2 from the image signal of the serial signal SI[7:0]. In the above notation, [7:3] represents 5-bit width data from bit 7 to bit 3 and [7:0] represents 8-bit width data from bit 7 to bit 0. In specific examples of the gate selection signals GS[7:0] and the source selection signals SS[7:3], when the gate signal line GL1 and the source signal line selection lines SL1 to SL8 are selected, the gate selection signals GS[7:0] are 00h and the source selection signals SS[7:3] are 00h.

In addition, the pixel redraw control unit 5 makes control so that the gate signal line 1 to be put in the on-state and the source signal line 2 to be put in the on-state are selected and the image data DATA[7:0] is selectively inputted for the pixel electrode part 4 for which redraw driving (described later in FIG. 6) is selected. In contrast, the pixel redraw control unit 5 makes control so that display is performed using the image data held in the pixel electrode part 4 without inputting the image data for the pixel electrode part 4 for which still picture driving (described later in FIG. 6) is selected.

It should be noted that the serial signal SI[7:0], the shift clock signal SCLK, and the data identification signal DEN outputted from the signal supply unit 6 are inputted to the pixel redraw control unit 5 via an input part 5a. In addition, the source selection signals SS[7:3] are outputted from an output part 5b1 of the pixel redraw control unit 5, the image data DATA[7:0] is outputted from an output part 5b2, and the gate selection signals GS[7:0] are outputted from an output part 5b3.

Here, the shift clock signal SCLK is a clock signal used to control the timing at which the source selection signals SS[7:0], the image data DATA[7:0], and the gate selection signals GS[7:0] (also simply referred to as "the source selection signals", "the image data", and "the gate selection signals") generated by the pixel redraw control unit 5 are outputted in parallel. In addition, the data identification signal DEN is a control signal used to control the timing at which the image data is generated.

The gate decoder circuit 12 generates the gate signal for sequentially selecting one (GLn) of the gate signal lines 1 (GL1 to GL256) to be connected to the display unit 10 based on the 8-bit gate selection signals GS[7:0] generated by the pixel redraw control unit 5 and the inverted signals (also referred to as the negative signal) thereof. Here, the enable signal ENB outputted from the signal supply unit 6 is inputted to each of AND devices in the gate decoder circuit 12 to control the timing at which the image data is supplied to each of the pixel electrode parts 4 described above.

The source decoder circuit 13 generates the source signal for sequentially selecting lines in the horizontal direction in units of eight of the source signal line selection lines 3 (SL1 to SL256) connected to the display unit 10 based on the 5-bit source selection signals SS[7:3] generated by the pixel redraw control unit 5 and the inverted signals thereof. Specifically, each of the AND elements in the source decoder circuit 13 selects the source signal line selection lines 3 (SLn to SLn+7) in units of eight based on the 5-bit width source selection signals SS[7:3] inputted from the signal supply unit 6 and the inverted signals thereof. For example, in the case of an AND element 13a, the source signal is generated so as to activate the source signal line selection lines 3 (SL1 to SL8) based on the source selection signals SS[7:3] and the inverted signals thereof. It should be noted that, as in the gate decoder circuit 12 described above, the enable signal ENB outputted from the signal supply unit 6 is inputted to the AND elements of the source decoder circuit 13 to control the timing at which the image data is supplied to the pixel electrode parts 4 described above.

When redraw driving is selected (that is, the gate signal line GLn and the source signal line selection line SLn are activated), the source signal line selector circuit 14 supplies the image data DATA[7:0] to the pixel electrode parts 4.

The display unit 10 has the pixel electrode parts 4 disposed in a matrix and each of the pixel electrode parts 4 is selected by the gate signal line GLn and the source signal line selection line SLn, and the image data DATA[7:0] is supplied to the selected pixel electrode part 4 via the source signal line DLn. Here, each of the pixel electrode parts 4 (P11 to Pmn) of the display unit 10 has the two TFT elements 101 for selecting the pixel electrode part. Common voltage lines 7 through which the common voltage Vcom is supplied, the gate signal lines 1 (GL1 to GL256) through which the gate signal is supplied, the source signal lines 2 (DL1 to DL256) through which the image data is supplied, and the source signal selection lines 3 (SL1 to SL256) through which the source signal for selecting the source signal lines 2 (DL1 to DL256) is supplied are connected to the individual pixel electrode parts 4.

In addition, in the display unit 10, redraw driving is performed in the pixel electrode part 4 disposed at the intersection between the gate signal line 1 in the on-state and the source signal line 2 in the on-state. In contrast, in the pixel electrode part 4 on which redraw driving is not executed, the image data is not inputted and still picture driving is performed. The pixel electrode part 4 for which still picture driving is selected undergoes still picture driving using the image data held in the holding circuit (holding circuit 162 in FIG. 6).

A clock control unit 20 is an example of an external device to be connected to the dot matrix display device according to the invention. The clock control unit 20 has a clocking function therein, generates at least a video signal required for time display, and outputs the video signal to the signal supply unit 6 described above.

The dot matrix display device according to the embodiment configured as described above has the following effects. That is, the pixel redraw control unit 5 does not input the image data to the pixel electrode parts 4 for which still picture driving is selected and the pixel electrode parts 4 for which still picture driving is selected undergo still picture driving using the image data held in the holding circuit, so display in which still picture display is combined with motion picture display can be performed at extremely low power consumption. In addition, since the pixel redraw control unit 5 has the input part 5a to which the gate address signal, the source address signal, and the image signal are inputted serially, the wiring structure can be simplified by reducing the number of terminals through which the signals are inputted. In addition, since the pixel redraw control unit 5 has the output parts 5b1, 5b2, and 5b3 from which the gate selection signals GS[7:0], the source selection signals SS[7:3], and the image data DATA[7:0] are outputted in parallel, the transfer time of these signals can be kept short.

In the following description, the pixel redraw control unit may be referred to as the interface circuit, the gate address may be referred to as the vertical address, and the source address may be referred to as the horizontal address. In addition, the common voltage lines 7 in FIG. 1 are voltage lines through which the common voltage (Vcom) is applied to the pixel electrode parts 4.

Figure 2:
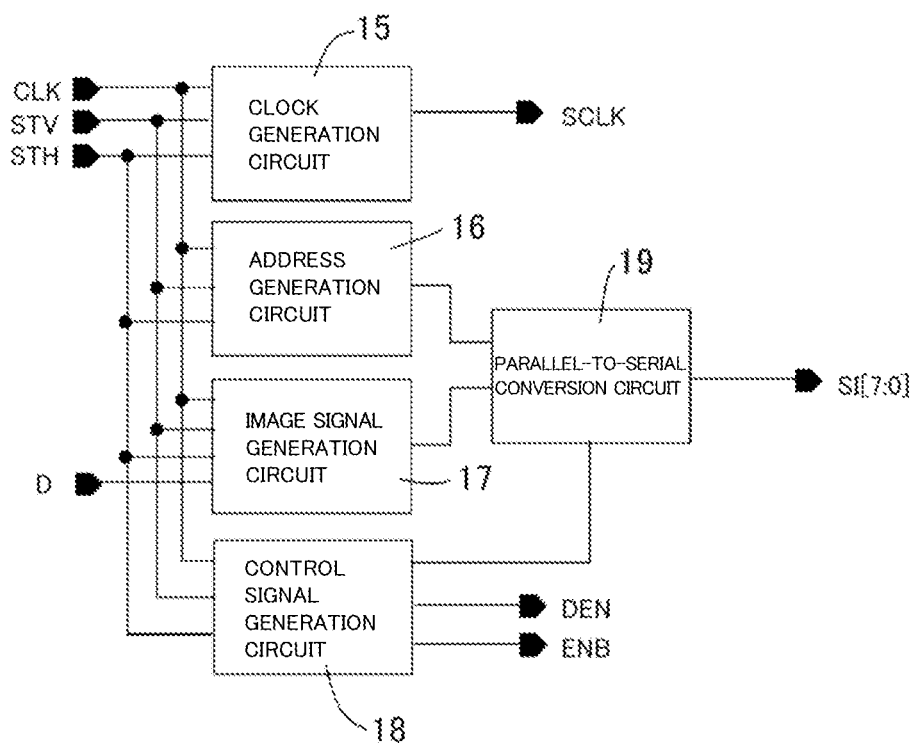
FIG. 2 is a block diagram illustrating an example of the structure of a signal supply unit of the dot matrix display device in FIG. 1.

FIG. 2 is a block diagram illustrating an example of the structure of the signal supply unit 6. As illustrated in this drawing, the signal supply unit 6 has a clock generation circuit 15, an address generation circuit 16, an image signal generation circuit 17, a control signal generation circuit 18, and a parallel-to-serial conversion circuit 19 that are respectively connected in parallel to a clock signal line through which a clock signal CLK is transmitted, a vertical sync signal line through which the vertical sync signal STV is transmitted, a horizontal sync signal line through which the horizontal sync signal STH is transmitted. The clock generation circuit 15 generates and outputs the shift clock signal SCLK based on the clock signal CLK, the vertical sync signal STV, and the horizontal sync signal STH. The address generation circuit 16 outputs the address signals (gate address signal and source address signal) for specifying the addresses at which redraw driving is executed to the parallel-to-serial conversion circuit 19 based on the clock signal CLK, the vertical sync signal STV, and the horizontal sync signal STH. The image signal generation circuit 17 generates an image signal based on the clock signal CLK, the vertical sync signal STV, the horizontal sync signal STH, and a video signal D and outputs the generated image signal to the parallel-to-serial conversion circuit 19. The control signal generation circuit 18 outputs the data identification signal DEN and the enable signal ENB based on the clock signal CLK, the vertical sync signal STV, and the horizontal sync signal STH. In addition, the parallel-to-serial conversion circuit 19 outputs the serial signal SI[7:0] including the gate address signal, the source address signal, and the image signal.

Figure 3A:
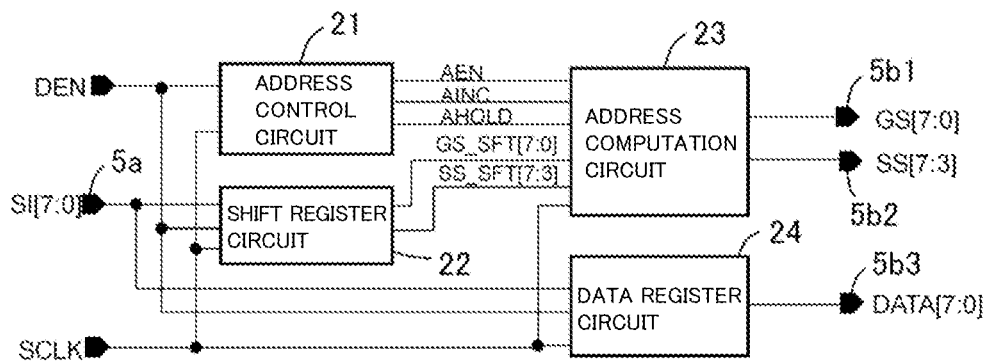
FIG. 3A is a block circuit diagram illustrating the entire structure of the pixel redraw control unit of the dot matrix display device in FIG. 1.

FIG. 3A is a block diagram illustrating the entire structure of the pixel redraw control unit 5 of the dot matrix display device 11 in FIG. 1. As illustrated in FIG. 3A, the pixel redraw control unit 5 includes an address control circuit 21, a shift register circuit 22, an address computation circuit 23, and a data register circuit 24. The address control circuit 21 generates the mutually exclusive (that is, not activated concurrently) control signals AEN, AINC, and AHOLD for controlling the operation of the address computation circuit 23 based on the shift clock signal SCLK and the data identification signal DEN generated by the signal supply unit 6, selects one of these control signals, and outputs the selected control signal to the address computation circuit 23.

Figure 3B:
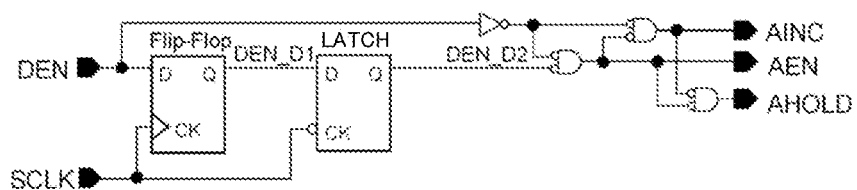
FIG. 3B is a circuit diagram illustrating an example of the structure of the address control circuit of the pixel redraw control unit in FIG. 3A.

FIG. 3B is a circuit diagram illustrating an example of the structure of the address control circuit 21 illustrated in FIG. 3A. The address control circuit 21 includes a register circuit having a D-type flip-flop, a D-type latch circuit, an inverter, and a logic AND circuit and generates the control signals AEN, AINC, and AHOLD for controlling the operation of the address computation circuit 23. The control signal AEN is activated when output signals GS SFT and SS SFT of the shift register circuit 22 are captured by the address computation circuit 23 and the active state (H) is kept for the period from a transition of the data identification signal DEN from L (low) to H (high) to the L edge of the next shift clock signal SCLK, as illustrated in FIG. 12A to FIG. 13B below. The control signal AINC is activated when the calculation result of an address is reflected to the address computation circuit 23 and this control signal is activated for the period for which the data identification signal DEN is "H" and the control signal AINC is "L", as illustrated in FIG. 12A to FIG. 13B below. The control signal AHOLD is activated when the current address signal is held and this control signal is activated for the period for which the control signal AEN is "L" and the control signal AINC is "L". It should be noted that the control signals AEN, AINC, and AHOLD cannot be activated concurrently.

Figure 5A:
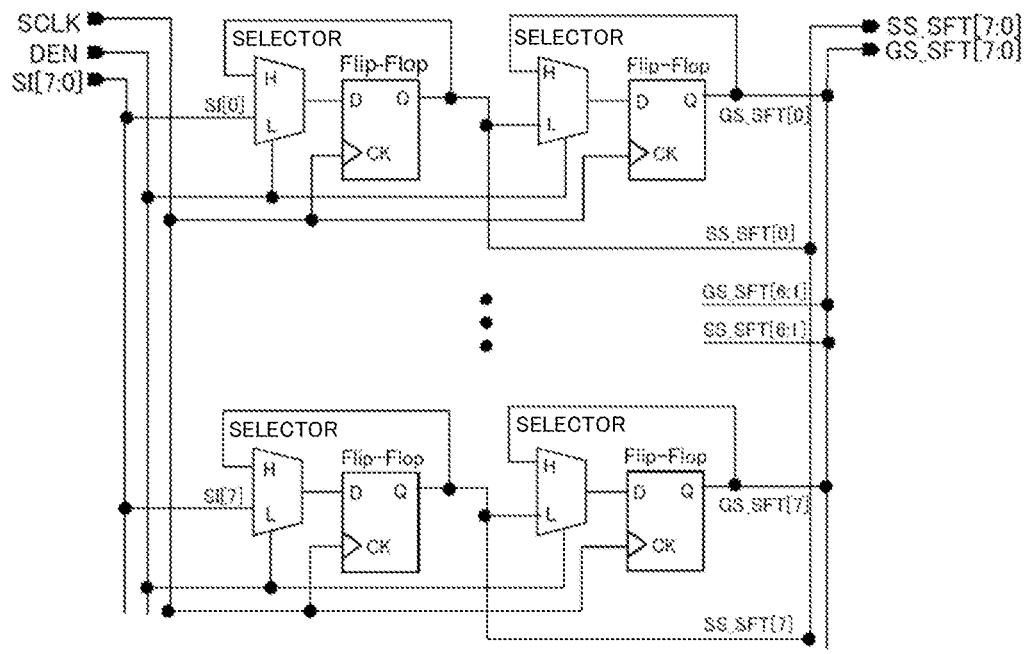
FIG. 5A is a circuit diagram illustrating an example of the structure of the shift register circuit of the pixel redraw control unit in FIG. 3A.

FIG. 5A is a circuit diagram illustrating an example of the structure of the shift register circuit 22 illustrated in FIG. 3A. The shift register circuit 22 performs serial-parallel (serial-to-parallel) conversion of the serial signal SI[7:0] including the gate address signal and the source address signal serially inputted via the input part 5a. Then, the gate selection signal shift signals GS SFT[7:0] for generating the gate selection signals GS[7:0] and the source selection signal shift signals SS SFT[7:3] for generating the source selection signals SS[7:3] are outputted to the address computation circuit 23. It should be noted that the address in the following description represents both the gate address and the source address.

In addition, in the shift register circuit 22, a pair of register circuits each including a selector and a D-type flip-flop is connected in series for each of the address bits of the serial signal SI[7:0]. The vertical address signal and the horizontal address signal inputted serially are shifted in sync with the shift clock signal SCLK, the gate selection signal shift signal GS SFT and the source selection signal shift signal SS SFT are generated, and the generated signals are outputted to the circuit parts corresponding to the address bits of the address computation circuit 23. The shift operation is performed when the data identification signal DEN is inactive.

Figure 4:
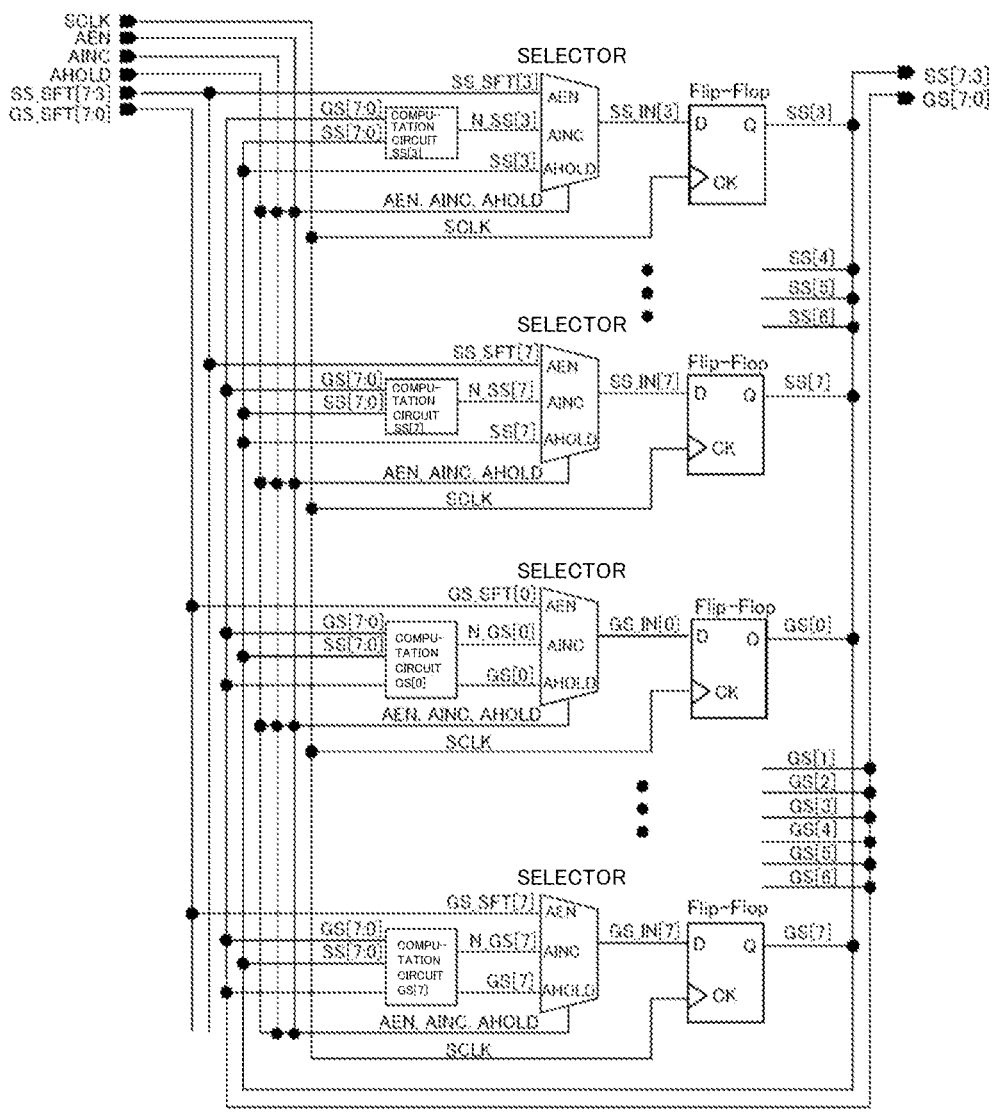
FIG. 4 is a circuit diagram illustrating an example of the structure of the address computation circuit of the pixel redraw control unit in FIG. 3A.

FIG. 4 is a circuit diagram illustrating an example of the structure of the address computation circuit 23 illustrated in FIG. 3A above. The address computation circuit 23 has a register circuit including a computation circuit, a selector, and a D-type flip-flop for each of the address bits. The selector generates an input signal SS_IN or GS_IN to the register circuit based on one control signal selected from the mutually exclusive control signals AEN, AINC, and AHOLD. In addition, when the control signal AEN is activated, each of the selectors selects the gate selection signal shift signal GS SFT or the source selection signal shift signal SS SFT, which is an output signal from the shift register circuit 22. When the control signal AINC is activated, each of the selectors selects an output signal N_SS or N_GS from the computation circuit. When the control signal AHOLD is activated, each of the selectors selects the current value SS or GS of the register circuit. One of these signals selected by each of the selectors is captured at the rising edge of the next shift clock signal SCLK by the register circuit of the next stage as the input signal SS_IN or the input signal GS_IN. It should be noted that "the signal is activated" means that the signal is put in the on-state (H: high state) and "the signal is inactivated" means that the signal is put in the off-state (L: low state).

In addition, the address computation circuit 23 generates the gate selection signals GS[7:0] based on the gate selection signal shift signals GS SFT[7:0] generated by the shift register circuit 22 described above, generates the source selection signals SS[7:3] based on the source selection signal shift signals SS SFT[7:3], and outputs these signals through the output parts 5b1 and 5b2 in parallel. In addition, when accessing the successive pixel electrode parts 4 (during successive access), the address computation circuit 23 computes and generates the gate address signal and the source address signal corresponding to the address of the next pixel electrode part 4 based on the gate address signal and the source address signal captured first, outputs these signals to the gate decoder circuit 12 and the source decoder circuit 13, computes and generates the gate address signal and the source address signal corresponding to the address of the next pixel electrode part 4 again, outputs these signals to the gate decoder circuit 12 and the source decoder circuit 13, and repeats this process until the last pixel electrode part 4 is reached. That is, when the plurality of pixel electrode parts 4 on which redraw driving is executed are continuous in a predetermined direction, the address computation circuit 23 preferably generates the source selection signals SS[7:3] to be outputted to the plurality of pixel electrode parts 4, based on one source address signal. In this case, since only one source address signal needs to be serially inputted to the pixel redraw control unit 5 even though redraw driving is executed on the plurality of pixel electrode parts 4, the transfer time of the signals can be further reduced. In addition, when the plurality of pixel electrode parts 4 on which redraw driving is executed are continuous in a direction intersecting the predetermined direction, the address computation circuit 23 preferably generates the gate selection signals GS[7:0] to be outputted to the plurality of pixel electrode parts 4, based on one gate address signal. In this case, since only one gate address signal needs to be serially inputted to the pixel redraw control unit 5 even through redraw driving is executed on the plurality of pixel electrode parts 4, the transfer time of the signals can be further reduced.

In addition, the computation circuit of the address computation circuit 23 computes and generates the next address value based on the current address value during successive access according to the specification of successive addresses. A different logic circuit is used for each of the address bits and the increment (addition) of an address value and the decrement (subtraction) of an address value change depending on the specification of successive addresses. Although both the horizontal address and the vertical address are the target of computation by the computation circuit, only one of the horizontal address and the vertical address may be the target of computation. When the horizontal address is the target of computation, the range of horizontal addresses in one line is the target. When the vertical address is the target of computation, the range of vertical addresses in one row is the target.

Figure 5B:
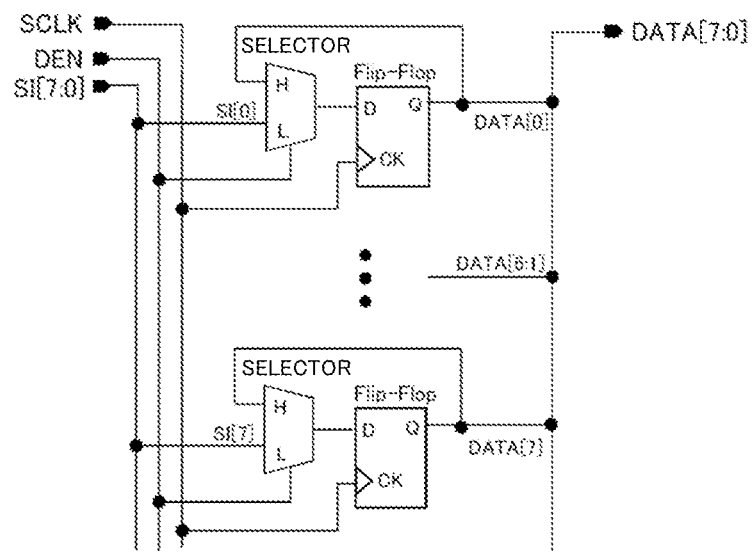
FIG. 5B is a circuit diagram illustrating an example of the structure of the data register circuit of the pixel redraw control unit in FIG. 3A.

FIG. 5B is a circuit diagram illustrating an example of the structure of the data register circuit 24 illustrated in FIG. 3A above. It should be noted that data in the data register circuit 24 means image data (image signal). This data register circuit 24 includes register circuits corresponding to the address bits of the inputted serial signal SI[7:0] and each of the register circuits includes a selector and a D-type flip-flop. The data register circuit 24 holds the serial signal SI[7:0] as redraw signals. When the data identification signal DEN is activated, the inputted serial signal SI[7:0] are captured into the register circuits and the image data DATA[7:0] is outputted to the source signal line selector circuit 14 at the rising edge at which the shift clock signal SCLK shifts from "L" to "H" in the active period of the data identification signal DEN, as illustrated in FIG. 12A to FIG. 13B below.

Figure 6:
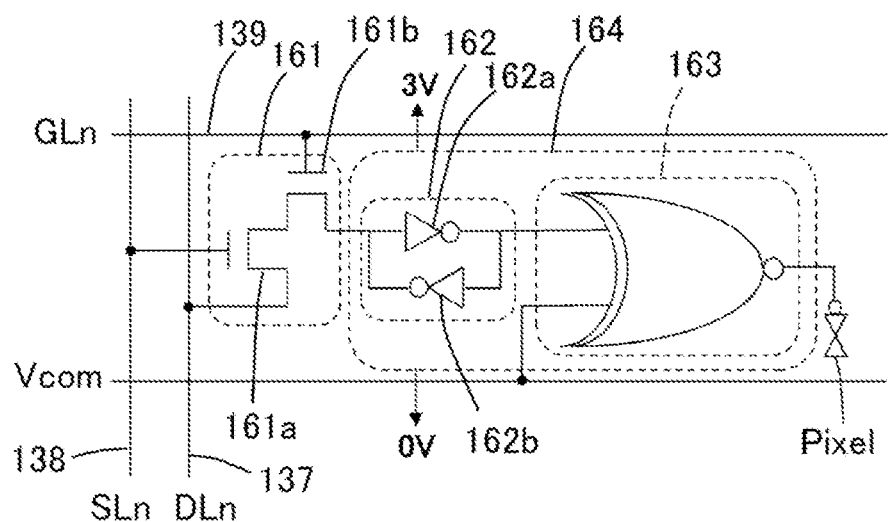
FIG. 6 is a block circuit diagram illustrating an example of the structure of a pixel electrode part including a drive selection circuit having a holding circuit and a pixel electrode control circuit in the dot matrix display device.
Figure 7:
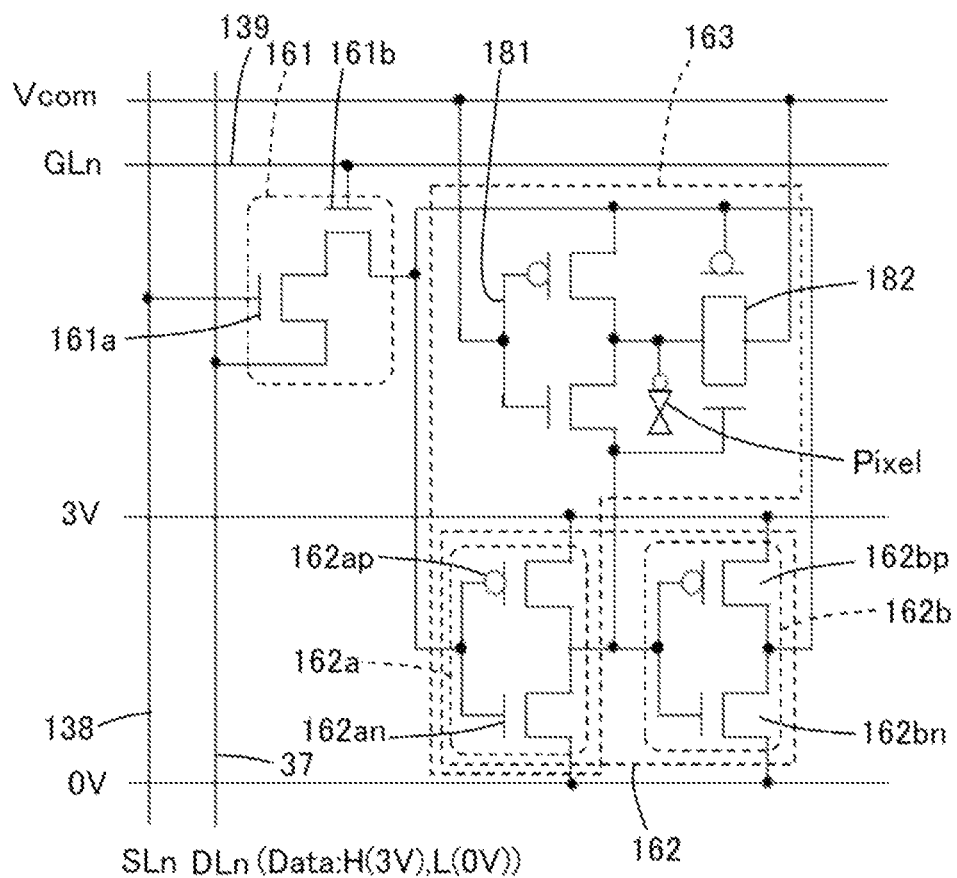
FIG. 7 is a detailed circuit diagram illustrating how TFT elements constituting each block of the pixel electrode part in FIG. 6 are connected.

FIG. 6 and FIG. 7 are circuit diagrams illustrating examples of the pixel electrode part 4 according to the embodiment. FIG. 6 is an example of a block circuit diagram illustrating the pixel electrode part 4 and FIG. 7 is an example of a detailed circuit diagram including TFT elements constituting individual blocks of the pixel electrode part 4. Here, a drive selection circuit 164 is a circuit which selects one of still picture driving and redraw driving based on the signal (gate signal) transmitted through a gate signal line 139 (GLn) and the signal (source signal) transmitted through a source signal line selection line 138 (SLn) and the drive selection circuit 164 includes the holding circuit 162 and a pixel electrode control circuit 163.

As illustrated in these drawings, an input part 161 of the front stage of the drive selection circuit 164 is provided with a transfer gate circuit in which first and second n-channel TFT elements 161a and 161b are connected in series. The first n-channel TFT element 161a close to a source signal line 137 (DLn) receives a signal having been transmitted to the gate electrode part thereof through the source signal line selection line 138 (SLn). The first n-channel TFT element 161a is turned on when this signal is "H" and the first n-channel TFT element 161a is turned off when this signal is "L". The second n-channel TFT element 161b close to the gate signal line 139 (GLn) receives a signal having been transmitted to the gate electrode part thereof through the gate signal line 139 (GLn). The second n-channel TFT element 161b is turned on when this signal is "H" and the second n-channel TFT element 161b is turned off when this signal is "L".

Accordingly, only when the signal (gate signal) having transmitted through the gate signal line 139 (GLn) is "H" and the signal (source signal) having transmitted through the source signal line selection line 138 (SLn) is "H", the transfer gate circuit is put in the closed state as an equivalent circuit, the signal having been transmitted through the source signal line 137 (DLn) is transmitted to the holding circuit 162, and redraw driving in which image data (redraw data) is updated is performed. Otherwise, still picture driving in which pixels are controlled based on image data held in the holding circuit until then is performed.

FIG. 6 also illustrates the structure of a static memory as the holding circuit 162. In the holding circuit 162, the first and second CMOS inverters 162a and 162b are connected in series and an output from the drain common connection point of the second (rear stage) CMOS inverter 162b fed back to the gate common connection point of the first (front stage) CMOS inverter 162a. Therefore, when an "H" signal is inputted to the gate common connection point of the first CMOS inverter 162a, an "L" signal is outputted from the drain common connection point of the first CMOS inverter 162a, this "L" signal is inputted to the gate common connection point of the second CMOS inverter 162b, an "H" signal is outputted from the drain common connection point of the second CMOS inverter 162b, and this "H" signal is fed back to the gate common connection point of the first CMOS inverter 162a. As a result, for example, signals always having "H", "L", and "H" are held in a loop-shaped transmission line.

Figure 8:
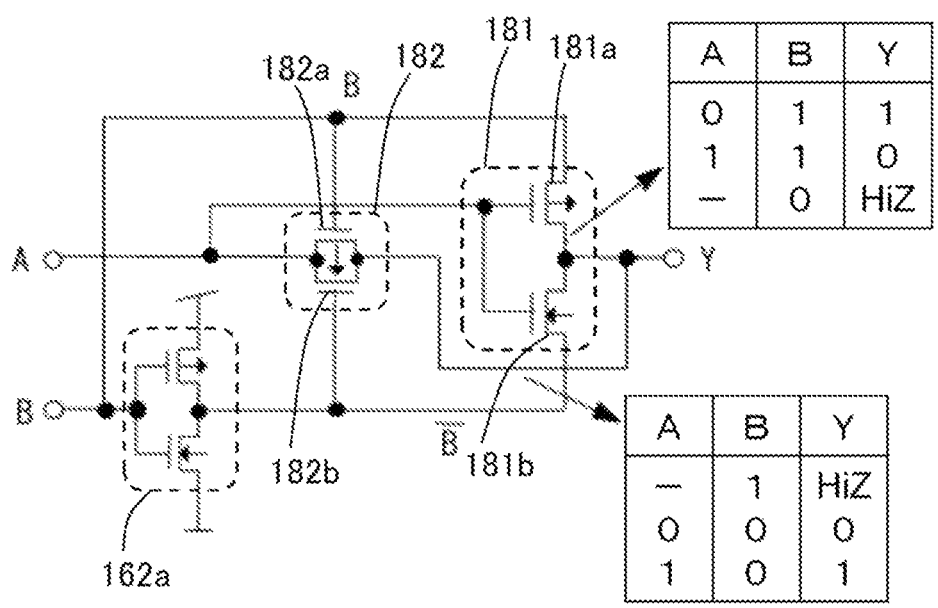
FIG. 8 is a detailed circuit diagram illustrating how TFT elements constituting the pixel electrode control circuit of the dot matrix display device are connected.

FIG. 8 is a circuit diagram illustrating how TFT elements constituting the pixel electrode control circuit 163 are connected. The pixel electrode control circuit 163 shares the first CMOS inverter 162a of the holding circuit 162 and includes the first CMOS inverter 162a which outputs an inverted signal iB (inversing superscript (-) is attached to the symbol in FIG. 8) of an image signal B, a first binary selection circuit 181, and a second binary selection circuit 182. The first binary selection circuit 181 includes a p-channel TFT element 181a and an n-channel TFT element 181b and outputs binary data by receiving the common voltage Vcom (A), the image signal data (B), and the output (iB) of the first CMOS inverter 162a. The second binary selection circuit 182 includes a p-channel TFT element 182a and an n-channel TFT element 182b, outputs binary data by receiving the common voltage Vcom (A), the image signal data (B), and the output (iB) of the first CMOS inverter 162a, and has an output line connected in parallel to an output line of the first binary selection circuit 181. The output of the first binary selection circuit 181 and the output of the second binary selection circuit 182 constitute exclusive OR (EXOR) logic gate outputs with respect to the common voltage Vcom (A) and the image signal data (B).

The first binary selection circuit 181 is a CMOS inverter in which the gate electrode parts of the p-channel TFT element 181a and the n-channel TFT element 181b are connected in common and the drain electrode parts thereof are connected in common and outputs binary data (Y) only when the image signal data (B) is an "H(1)" signal. In contrast, when the image signal data (B) is an "L(0)" signal, the first binary selection circuit 181 does not function as an inverter and is put in a high-impedance state (that is, an open state as an equivalent circuit), and does not output binary data (Y). The second binary selection circuit 182 is a four-terminal transfer gate circuit in which the source electrode parts of the p-channel TFT element 182a and the n-channel TFT element 182b are connected and the drain electrode parts thereof are connected, and uses the output (iB) of the first CMOS inverter 162a inputted to the gate electrode part of the n-channel TFT element 182b as a control input. The second binary selection circuit 182 outputs binary data (Y) only when the output (iB) of the first CMOS inverter 162a is "H(1)", that is, only when the image signal data (B) is "L(0)". In contrast, when the output (iB) of the first CMOS inverter is "L(0)", the second binary selection circuit 182 does not function as a transfer gate circuit and is put in the high-impedance state (that is, an open state as an equivalent circuit), and does not output binary data (Y). Since the output line of the second binary selection circuit 182 is connected in parallel to the output line of the first binary selection circuit 181 as described above, the output of the first binary selection circuit 181 and the output of the second binary selection circuit 182 constitute exclusive OR (EXOR) logic gate outputs with respect to the common voltage Vcom (A) and the image signal data (B). That is, the pixel electrode control circuit 163 is an exclusive OR logic gate circuit with respect to the common voltage Vcom (A) and the image signal data (B).

FIG. 9 is a truth table listing the common voltage Vcom (A) and the image signal data (B) as binary inputs and the output (Y) of an exclusive OR logic gate circuit. When the image signal data (B) is inputted to the pixel electrode part (that is, the image signal data (B) is an H(3V: "1") signal), an electric potential difference is generated between a pixel voltage Pixel and the common voltage Vcom (A) and black display is performed in a normally white mode or white display is performed in a normally black mode. Even when the common voltage Vcom (A) is inversely driven as described above, since the electric potential difference between the pixel voltage Pixel and the common voltage Vcom (A) is held, AC driving of liquid crystal is achieved to prevent degradation of the liquid crystal with the display in the pixel electrode part held. In contrast, when the image signal data (B) is not inputted to the pixel electrode part (that is, the image signal data (B) is an L(0 V: "0") signal), an electric potential difference is not generated between the pixel voltage Pixel and the common voltage Vcom (A) and white display is performed in the normally white mode or black display is performed in the normally black mode. Even when the common voltage Vcom (A) is inversely driven as described above, since the state in which no electric potential difference is present between the pixel voltage Pixel and the common voltage Vcom (A) is held, AC driving of liquid crystal is achieved to prevent degradation of the liquid crystal with the display in the pixel electrode part held.

In addition, when display in the pixel electrode part is redrawn, the transfer gate circuit in which the first and second n-channel TFT elements 161a and 161b are connected in series in the input part 161 of the front stage of the drive selection circuit 164 illustrated in FIG. 6 above, is turned on. That is, the signal having been transmitted through the gate signal line 139 (GLn) is set to "H" and the signal having been transmitted through the source signal line selection line 138 (SLn) is set to "H". In this state, the signal (data) having been transmitted through the source signal line 137 (DLn) is transmitted to the holding circuit 162. For example, when the signal (data) is "H", the holding circuit 162 holds the "H" signal (data). Then, the display corresponding to the case in which the data (B) in FIG. 9 is "H" is performed in the pixel electrode part 4. That is, the display in the pixel electrode part 4 is black display in the normally white mode or white display in the normally black mode.

In contrast, when the signal (data) is "L", the holding circuit 162 holds the "L" signal (data). Then, the display corresponding to the case in which the data (B) in FIG. 9 is "L" is performed in the pixel electrode part 4. That is, the display in the pixel electrode part 4 is redrawn to white display in the normally white mode or black display in the normally black mode.

Since the structure described above enables the dot matrix display device 11 according to the embodiment to perform redraw driving in the display area for each pixel (dot) and the other pixels to undergo still picture driving, the power consumption becomes extremely low. For example, the power consumption when still picture driving and redraw driving are performed by a full screen scan in a monochrome LCD for a wrist watch is approximately 100 μW. However, in the dot matrix display device describe above, the power consumption can be reduced to approximately 10 μW or less and further reduced to approximately 3 μW or less. Hereby the drivable period for, for example, one replacement of the battery can be extended to more than ten times even in an LCD having a complicated display structure.

Figure 11B:
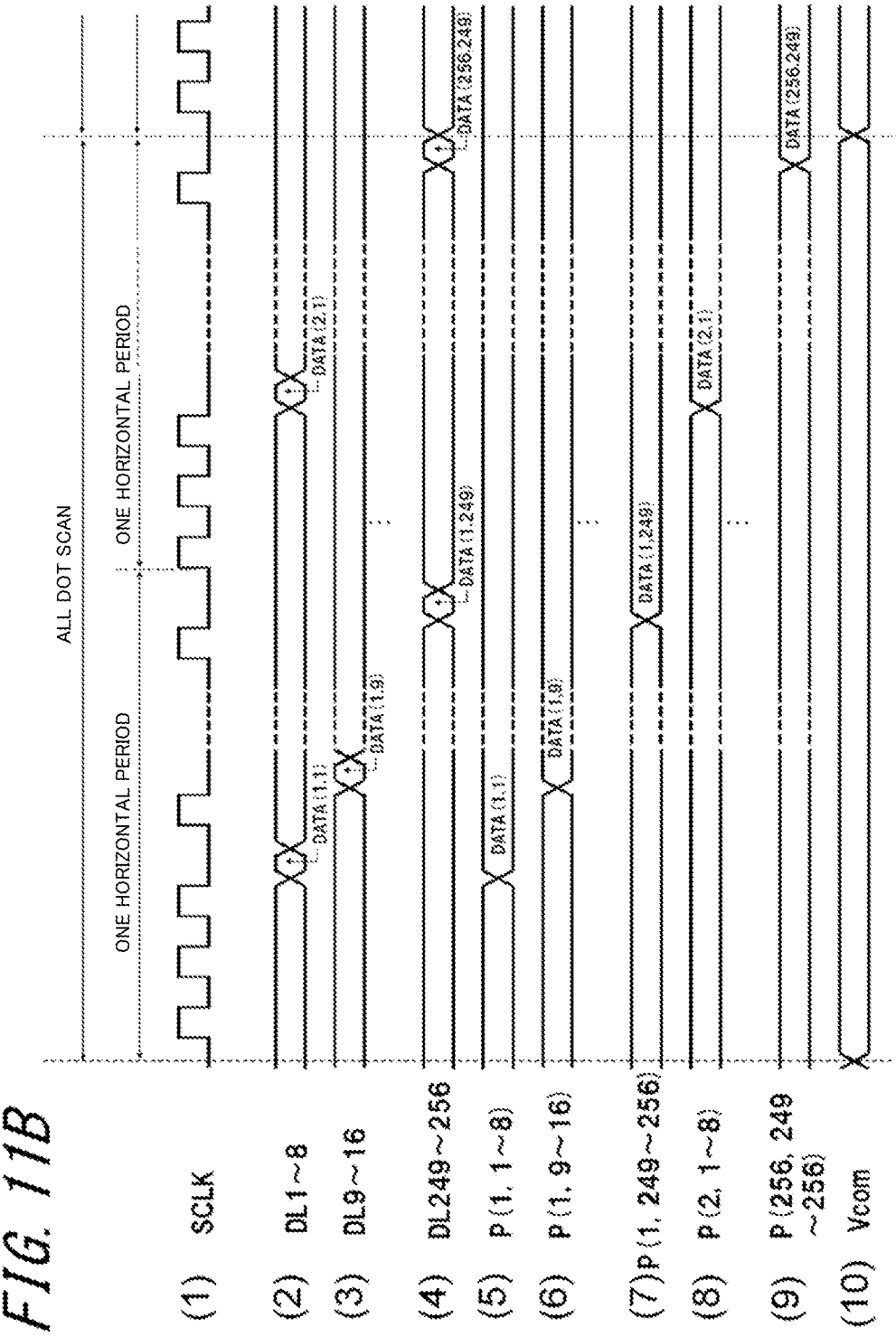
FIG. 11B is a part of a timing chart used to describe the entire operation of the dot matrix display device according to the invention, which corresponds to FIG. 11A.

The operation of the dot matrix display device 11 according to the embodiment configured as described above will be described below. FIG. 11A and FIG. 11B are timing charts illustrating the entire operation of the dot matrix display device 11 according to the invention.

First, as in the conventional case, when the vertical sync signal STV and the horizontal sync signal STH are inputted (not illustrated), after receiving the serial signal SI[7:0], the data identification signal DEN, and the shift clock signal SCLK from the signal supply unit 6 (not illustrated), the pixel redraw control unit 5 captures the gate address signal (GSn) and the source address signal (SSm) included in the serial signal SI[7:0] and identifies the vertical address for selecting the gate signal line GLn corresponding to the pixel to be redrawn and the horizontal address for selecting the source signal line selection line SLm corresponding to the pixel to be redrawn. Next, the pixel redraw control unit 5 activates the enable signal ENB, the gate signal line GLn, and the source signal line selection lines SLm to SLm+7 while the data identification signal DEN is activated and, captures the corresponding image data DATA(n, m) at the timing at which the above enable signal ENB is activated, supplies the image data DATA(n, m) to the holding circuits of the pixel electrode parts 4 (in this case, P(n, m) to P(n, m+7)), and redraws image data. Similarly, the image data DATA(n, m+8) to DATA(n, m+248) in one horizontal period are captured sequentially and the image data of the corresponding pixel electrode parts 4 (P(n, m+8) to P(n, m+255)) is redrawn.

Specifically, when the data identification signal DEN is activated, the image data DATA(1, 1) is captured at the timing at which the enable signal ENB, the gate signal line GL1, and the source signal line selection line SL1 are activated, the captured image data is supplied to the holding circuits of the corresponding eight pixel electrode parts 4 (P(1, 1) to P(1, 8)) in the horizontal direction, the image data is redrawn. Similarly, the image data DATA(1, 9) to DATA (1, 249) in one horizontal period are captured sequentially, the image data of the holding circuits of the corresponding pixel electrode parts 4 (P(1, 9) to P(1, 16), . . . , P(1, 249) to P(1, 256)) is redrawn by eight pixels in the horizontal direction. After that, similarly, the image data of the corresponding pixel electrode parts 4 is also redrawn in the last horizontal period and control for displaying one frame is completed.

Second Embodiment

Although the first embodiment has described the general entire operation of the dot matrix display device according to the invention, this embodiment particularly describes the case in which the pixel redraw control unit 5 performs drive control in units of one pixel.

Figure 12A:
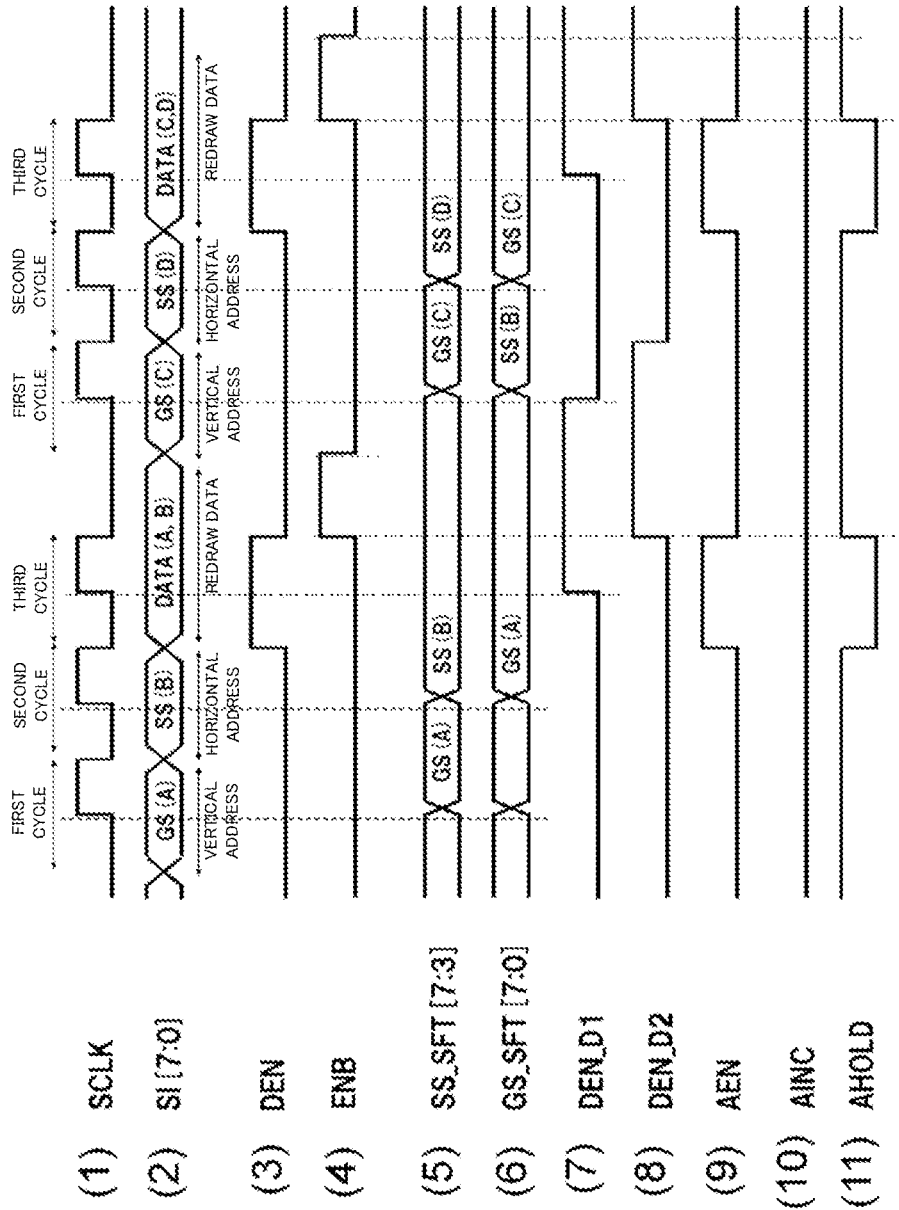
FIG. 12A is a part of a timing chart used to describe the operation of a dot matrix display device according to a first embodiment of the invention.
Figure 12B:
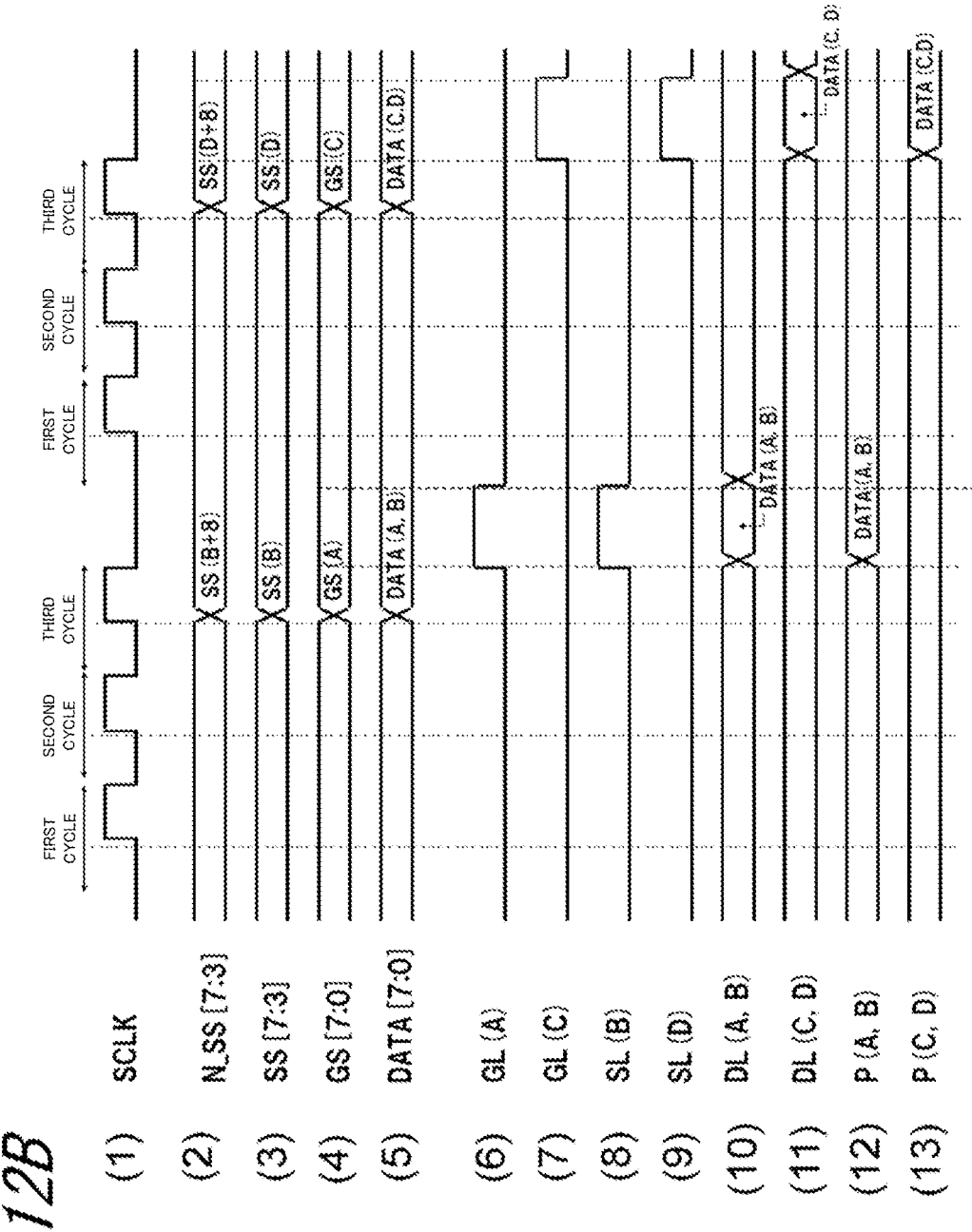
FIG. 12B is a part of a timing chart used to describe the operation of a dot matrix display device according to a second embodiment of the invention, which corresponds to FIG. 12A.

FIG. 12A and FIG. 12B are timing charts illustrating the operation of the pixel redraw control unit 5 of the dot matrix display device 11 according to the embodiment. That is, FIG. 12A and FIG. 12B are the timing charts illustrating random access in which each address is accessed randomly for redraw driving. First, in the first cycle and the second cycle in which the data identification signal DEN is inactive, the serial signal SI[7:0] including the gate address signal and the source address signal is inputted from the signal supply unit 6 to the shift register circuit 22 of the pixel redraw control unit 5. After that, the data identification signal DEN is activated and the image data DATA[7:0] on which redraw driving is executed in the third cycle is inputted to the data register circuit 24 of the pixel redraw control unit 5. The gate address signal and the source address signal captured in the shift register circuit 22 in the first cycle and the second cycle are captured in the address computation circuit 23 when the data identification signal DEN is activated and the control signal AEN is activated. In addition, the image data DATA [7:0] is captured in the data register circuit 24 when the data identification signal DEN is activated. Accordingly, at the timing of the rising edge of "H" of the shift clock signal SCLK in the third cycle, the input signals GS_IN that become the gate selection signals GS[7:0] are captured in a register circuit (D-type flip-flop) in the address computation circuit 23, the input signals SS_IN that become the source selection signals SS[7:3] are captured in a register circuit (D-type flip-flop) in the address computation circuit 23, and the serial signal SI[7:0] which becomes the image data DATA[7:0] is captured in a register circuit (D-type flip-flop) in the data register circuit 24 at the same time. After that, the image data DATA[7:0] is written to the holding circuits 162 of the pixel electrode parts 4 by activating the enable signal ENB that enables redrawing. Next, writing to the holding circuits 162 ends by inactivating the enable signal ENB. After that, by repeating the above first to third cycles again from the next shift clock signal SCLK, redrawing to another address is performed.

Third Embodiment

Although the second embodiment has described how drive control is performed in units of one pixel, this embodiment particularly describes the case in which pixels to be controlled by the pixel redraw control unit 5 are partially continuous.

Figure 13A:
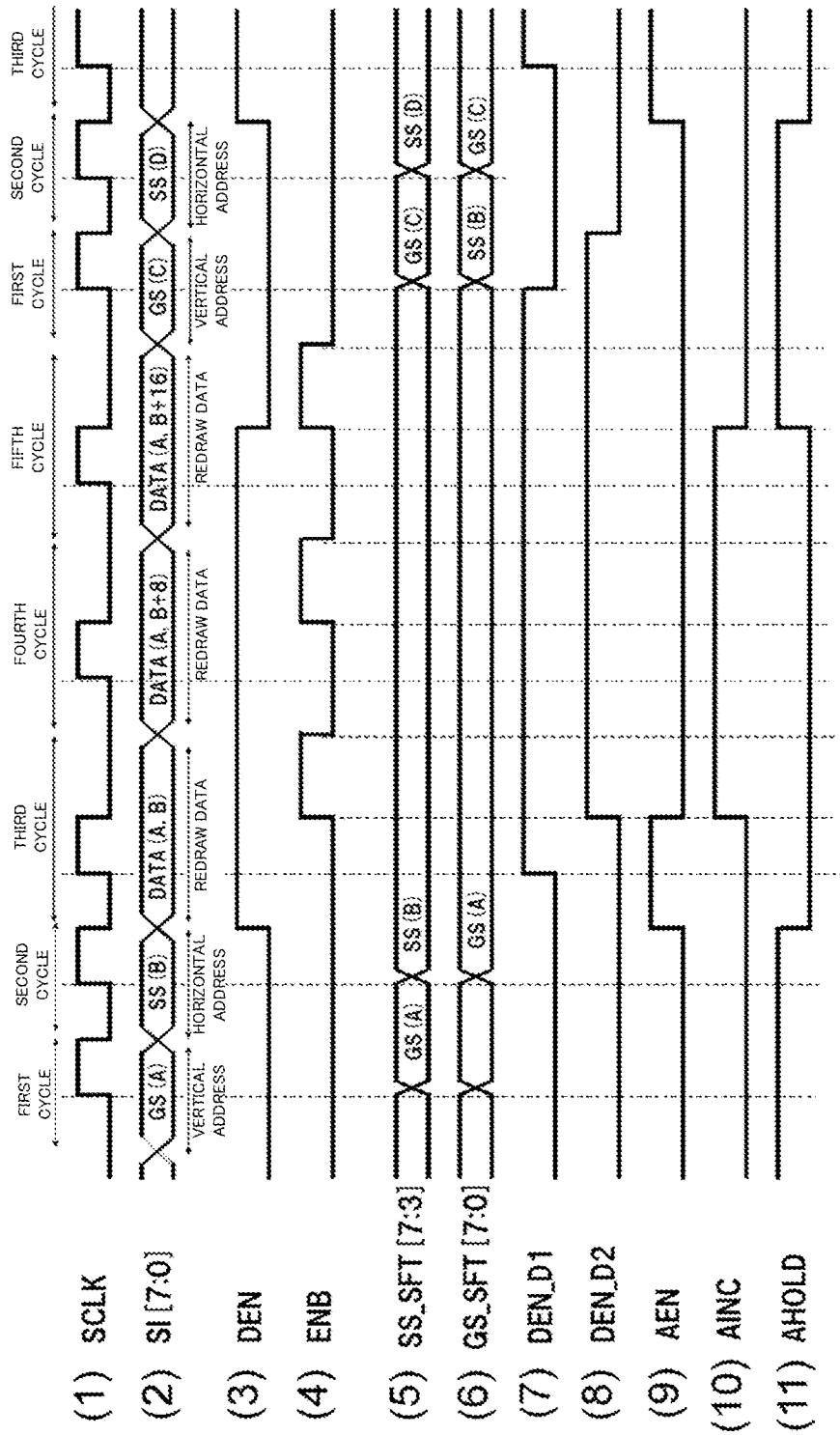
FIG. 13A is a part of a timing chart used to describe the operation of a dot matrix display device according to a second embodiment of the invention.
Figure 14:
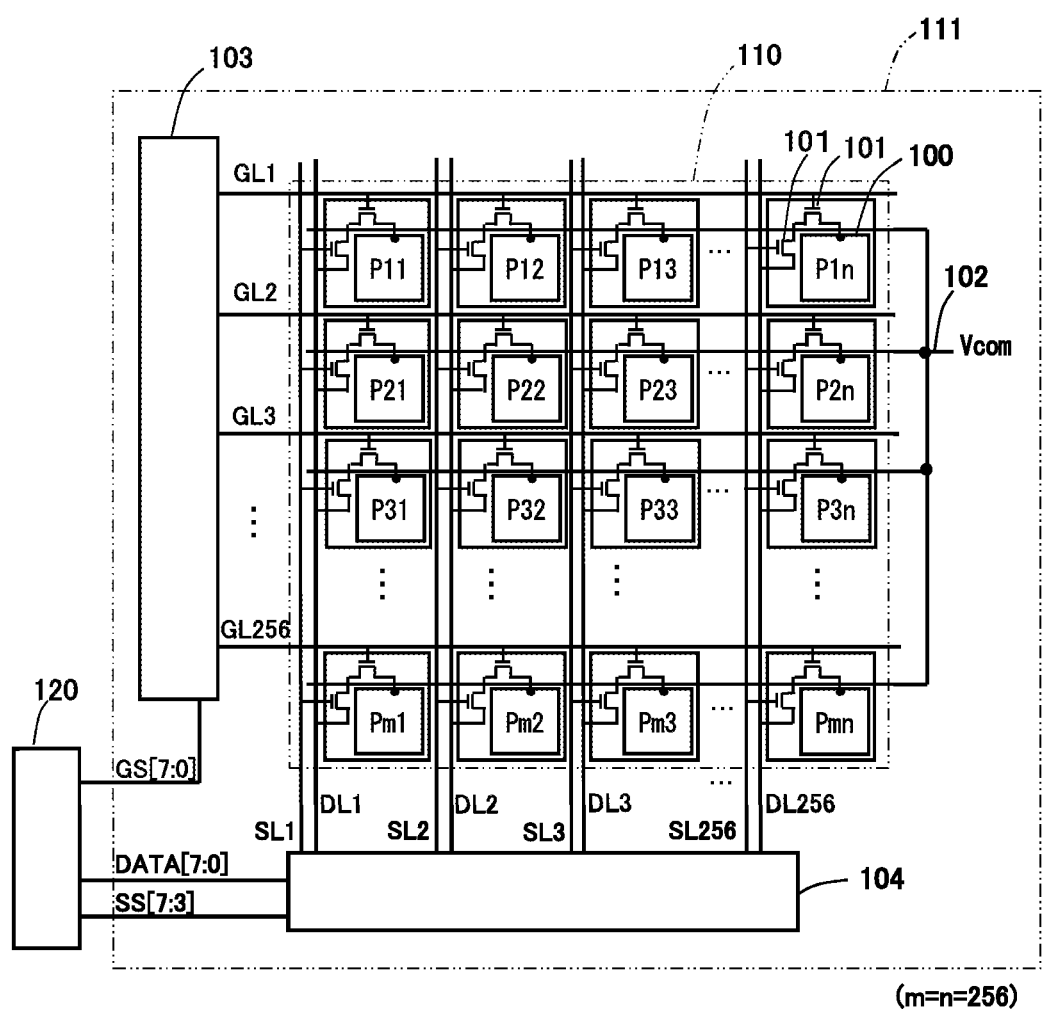
FIG. 14 is a block circuit illustrating the basic structure of a conventional dot matrix display device.
Figure 15A:
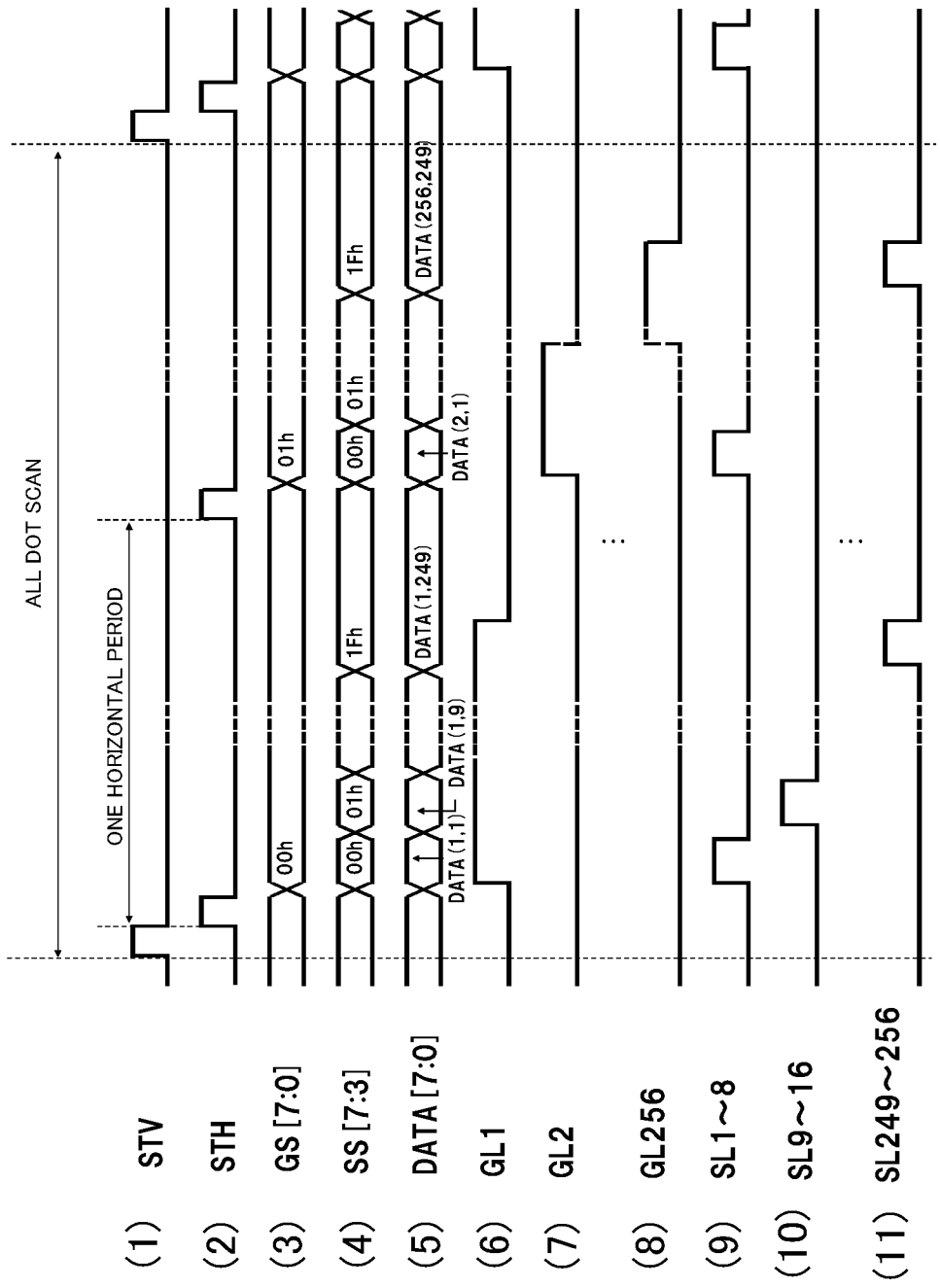
FIG. 15A is a part of a timing chart used to describe the operation of the conventional dot matrix display device.
Figure 15B:
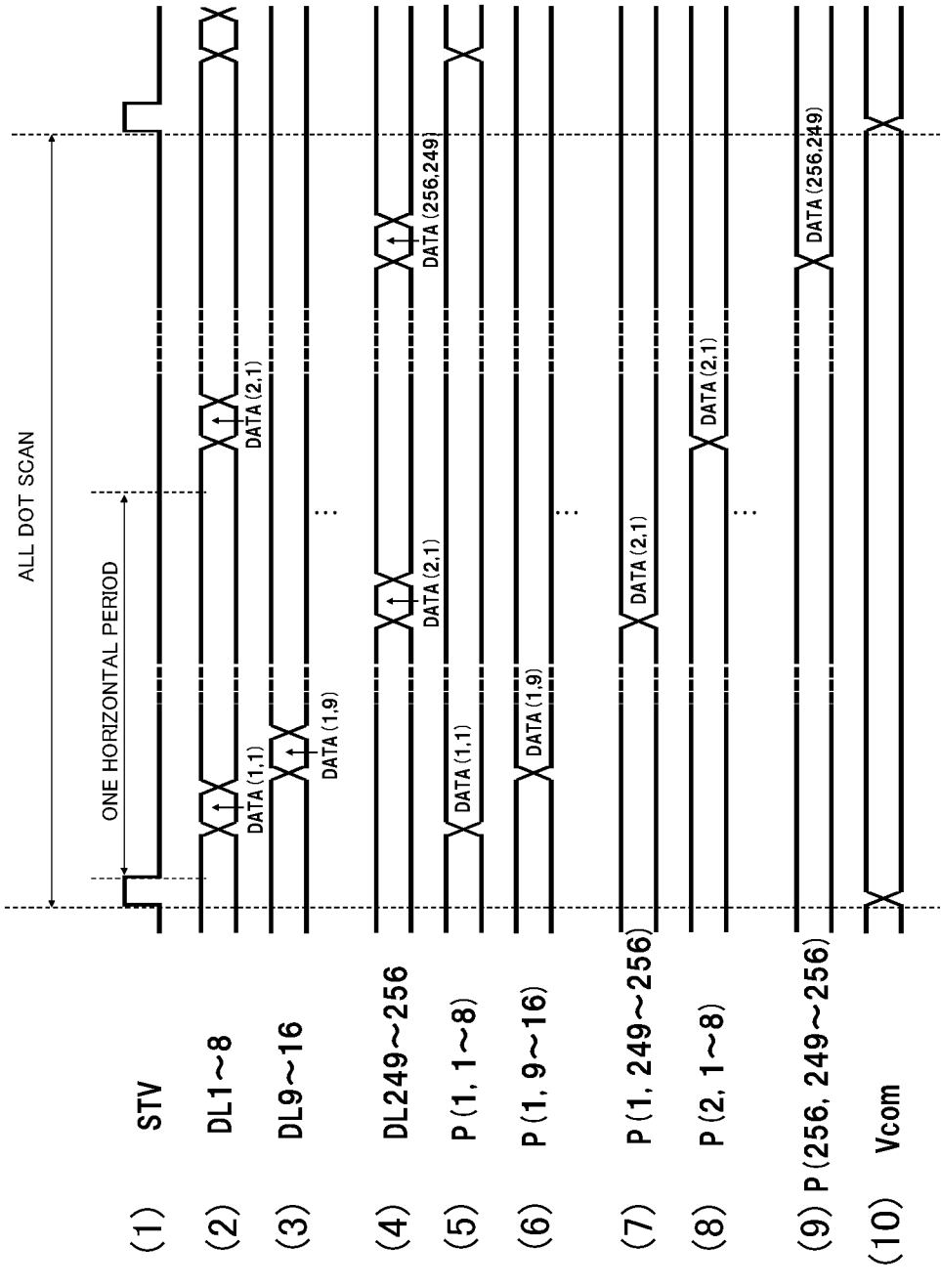
FIG. 15B is a part of a timing chart used to describe the operation of the conventional dot matrix display device, which corresponds to FIG. 15A.

FIG. 13A and FIG. 13B are timing charts illustrating the operation of the pixel redraw control unit 5 of the dot matrix display device according to the embodiment. That is, FIGS. 13A and 13B are the timing charts when successive addresses are accessed for redraw driving. The operation of the first cycle to the third cycle is the same as in the random access illustrated in FIG. 12A and FIG. 12B above. The gate address (GS (A)), the source address (SS (B)), and the image signal (DATA (A, B)) inputted serially in the third cycle are captured in the internal register and then the image data (DATA (A, B)) is written to the holding circuits 162 of the pixel electrode parts 4 by activating the enable signal ENB for executing redrawing. Next, the address computation circuit 23 computes the next address value based on the address value captured in the internal register. By keeping the data identification signal DEN active even after the third cycle, the control signal AINC is activated and the calculation result of the address computation circuit 23 is updated at the rising edge (fourth cycle) of "H" of the next shift clock signal SCLK in the internal register. In the fourth cycle, only the image data (DATA (A, B+8) corresponding to the next address obtained by computation is inputted from the input part 5a. After that, the image data (DATA (A, B+8)) is written to the holding circuit 162 by activating the enable signal ENB.

Also in the fifth and subsequent cycles, as in the fourth cycle, the holding circuit 162 can be redrawn by inputting only the image data (DATA (A, B+16)) corresponding to the next address obtained by computation from the input part 5a. As described above, when successive addresses are accessed, the address signal of only the start address signal needs to be inputted because the subsequent addresses are generated by the address computation circuit 23, so the transfer time of address signals for redraw driving can be reduced.

In the description of the first embodiment and the second embodiment, as for the computation target range of the address, the horizontal address and the vertical address are computed together and the vertical address is disposed as the higher address as illustrated in FIG. 12A, FIG. 12B, FIG. 13A, and FIG. 13B. However, only the horizontal address or only the horizontal address may be the target of computation.

In addition, as for the content of address computation, although addition of the address (incremented by eight bits) has been described (added value is 1 for eight bits), the address may be subtracted and the added or subtracted value may be other than 1 (for eight bits).

In addition, the computation target range and the content of address computation may be switched dynamically by a register or the like added to the pixel redraw control unit 5.

Although the bit width of the input signal SI inputted serially is eight bits ([7:0]), similar effects can be obtained by using a structure similar to that of the invention even when the bit width is not eight bits.

In addition, the dot matrix display device according to the invention may adopt a preferable structure as described below. A plurality of display areas each having an optimum redraw cycle can be provided in one display panel. In this case, by setting the period between one redrawing and the next redrawing to a very long period in one display area and setting the period between one redrawing and the next redrawing to a short period in another display area, the power consumption can be controlled at high accuracy. As a result, the power consumption can be further reduced.

In addition, preferably, a plurality of display areas to which redraw driving is applied are provided so as to have different redrawing cycles and the ratio between different redrawing cycles is ten times or more. In this case, by setting the period between one redrawing and the next redrawing to a very long period in one display area and setting the period between one redrawing and the next redrawing to a short period in another display area, the power consumption can be minutely controlled at high accuracy. As a result, the power consumption can be further reduced. In addition, by making the ratio between different redrawing cycles ten times or more, the effect of further reducing the power consumption is improved.

Figure 10:
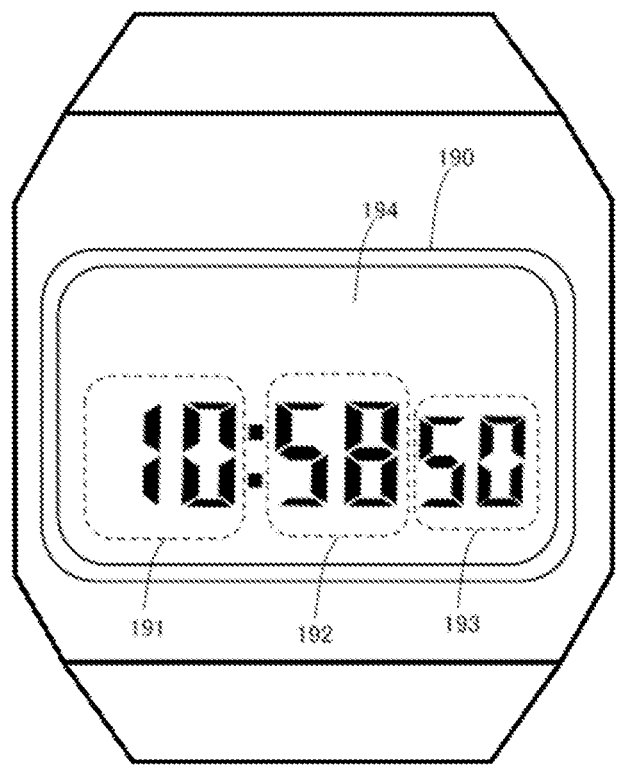
FIG. 10 illustrates an example of a display panel of a digital display wristwatch to which the dot matrix display device according to the invention has been applied.

FIG. 10 illustrates an example of a display panel 190 of a digital display wristwatch 195 to which the dot matrix display device 11 has been applied. The digital display wristwatch 195 as the time display device according to the invention has a clocking function therein, generates at least a video signal required for time display such as hours, minutes, and seconds, and outputs the generated video signal to the dot matrix display device 11 according to the redrawing cycles of these display contents (a synchronization signal and a clock signal may be generated together with the above video signal so as to be displayed in the dot matrix display device 11). For example, as illustrated in FIG. 10, the redrawing cycles of a display area 191 for displaying hours, a display area 192 for displaying minutes, and a display area 193 for displaying seconds of the display panel 190 may be greatly different from each other. The display area 193 for displaying seconds only needs to undergo redraw driving for every second, the display area 192 for displaying minutes only needs to undergo redraw driving for every minute, and the display area 191 for displaying hours only needs to undergo redraw driving for every hour. Accordingly, the display area other than the display areas 191 to 193 is the display area 194 for a still picture. In a preferable embodiment, the ratio between the redraw driving cycles of the display area 192 for displaying minutes and the display area 193 for displaying seconds is sixty times. In other words, the ratio is 1/60. In addition, since the display area 191 for displaying hours only needs to be undergo redraw driving every hour, the ratio between the redraw driving cycles of the display area 193 for displaying seconds and the display area 191 for displaying hours is 3600 times. In other words, the ratio is 1/3600. In addition, although redraw driving can be performed for each pixel in the display areas 191 to 193, redraw driving may be performed every multiple pixels. In addition, all pixels may be redrawn in the display area 191 to 193 or only the necessary pixels may be redrawn. For example, when "5" is redrawn to "6" in one display area, since the pixels to be redrawn can be distinguished from the pixels not to be redrawn, only the pixels to be redrawn can be redrawn.

In addition, when a radio wave signal indicating mail reception is received by a wrist watch from a mobile phone, a smartphone, a tablet terminal, a personal computer, or the like, the display panel including the LCD or the like of the wrist watch can indicate the reception of mail using redraw driving of a pixel selective driving method. Such a complicated display function can be achieved at extremely low power consumption. It is possible to display, at an optimum redrawing cycle or at any timing, for example, air temperature, humidity, altitude, bearing, illuminance, atmospheric pressure, water depth, water pressure, weather forecast, time difference with a foreign country, pedometer, tidal time, sunrise and sunset times, blood pressure, pulse rate, mail content, news flash, notification of earthquake early warning, or the like. In addition, a person can control the redrawing cycle or display timing by inputting or changing it externally. A control LSI or the like disposed on the periphery of the dot matrix display device 11 can change or control the redrawing cycle or control the display timing.

In the dot matrix display device 11 according to the invention, the redrawing period corresponding to each of the redrawing cycles of the display areas includes the operation time for redrawing and the non-redrawing time other than the operation time and the non-redrawing time is preferably longer than the operation time. This structure increases the speed of display switching accompanied by redrawing and makes the recognition of the display switching process difficult, thereby providing good visibility during display switching. For example, when indication of seconds is redrawn in a clock, it is desirable to set the redrawing period to 1 second, the operation time for redrawing to approximately 0.1 to 0.3 second (10% to 30%), and the remaining non-redrawing time to approximately 0.7 to 0.9 second.

In addition, it is preferable to make the number of pixels of the display area having a short redrawing period such as the display area for displaying seconds smaller that the number of pixels of the display area having a long redrawing period such as the display area for displaying minutes or hours. This can further reduce the power consumption. For example, the number of pixels of the display area having a short redrawing period is preferably 30% or less, more preferably 10% or less of the number of pixels of the display area having a long redrawing period.

The dot matrix display device 11 according to the invention is preferably a reflective LCD having reflective electrodes as pixel electrodes. In this case, the holding circuits and the like can be disposed below the pixel electrodes to prevent reduction in the light reflectivity due to the holding circuits and the like. In contrast, when transparent pixel electrodes are laminated with the holding circuits 162 in a transmissive LCD, transmitted light may cause a misoperation of TFT elements included in the holding circuit 162 and the like. Accordingly, the gate electrode parts of the TFT elements need to be covered with a light-shielding film and this easily reduces the aperture ratio. In addition, since a reflective LCD does not need to have a backlight, the power consumption can be reduced effectively. In addition, the dot matrix display device 11 according to the invention may be a semi-transmissive liquid crystal display having reflective areas having the above reflective electrodes and transmissive areas having the transmissive electrodes in the areas of the pixel electrode.

In addition, the number of bits held by the holding circuit is preferably one or more. In the case where this number of bits is increased to two or more, gray-scale display can be performed in still picture display. In addition, if the holding circuit stores analog signals, full color display can be performed.

In addition, the pixel electrode control circuit performs still picture driving and redraw driving for any signal (H or L) of the common voltage Vcom, as illustrated in the truth table in FIG. 9. That is, an electric potential difference is formed between the common voltage Vcom (A) and the pixel voltage Pixel (L: 0V) when the common voltage Vcom (A) is H(3V) and the image signal data (B) is H(3V), an electric potential difference is also formed between the common voltage Vcom (A) and the pixel voltage Pixel (H: 3V) when the common voltage Vcom (A) is L(0V) and the image signal data (B) is H(3V), and AC driving of the liquid crystal is performed. Accordingly, the common voltage Vcom (A) can be inverted every second between H and L according to the redrawing cycle of, for example, indication of seconds, thereby enabling suppression of degradation of liquid crystal molecules. That is, it is possible to suppress reduction in the service life because DC voltage components are applied to liquid crystal molecules for a long time to cause unevenness (immobilization of minute purities) of positive and negative electric charges on the pixel electrode surface.

As described above, the common voltage Vcom is preferably inverted periodically between H and L in conjunction with the redrawing period. In this case, a control circuit for individually controlling the common voltage Vcom does not need to be added as compared with the case in which the common voltage Vcom is inverted between H and L not in conjunction with the redrawing period, and the power consumption can be further reduced effectively. In addition, inversion driving of the common voltage Vcom between H and L has the role of suppressing the degradation of liquid crystal molecules and the role of a pixel voltage control signal as a control input to the pixel electrode control circuit of an EXOR logic gate circuit and this also contributes to further reduction in the power consumption.

In addition, in the dot matrix display device 11 according to the invention, it is preferable that in the display area to which still picture driving is applied, the common voltage supplied to the pixel electrode parts is inverted periodically between high and low. This suppresses degradation of liquid crystal molecules in the areas to which still picture driving is applied as well as the display area to which redraw driving is applied. In addition, the periodical cycle of inversion of the common voltage Vcom can be set to one second, several tens of seconds, several minutes, or several hours as appropriate by a control LSI or the like. In addition, the cycle of inversion of the common voltage Vcom may be set to n seconds (n is a natural number), the redrawing cycle of display of seconds may be used as the base of inversion control of the common voltage Vcom in this case, and inversion of the common voltage Vcom can be easily controlled.

In the dot matrix display device 11 according to the invention, an auxiliary capacitor of approximately 1 to 3 pF may be connected in parallel between the pixel electrode control circuit and the pixel electrode. This makes it possible to suppress gradual reduction of the pixel voltage in one field period and to hold the pixel voltage for one field period during redraw driving.

In addition, the n-channel TFT element and p-channel TFT element may be formed of low-temperature polycrystalline silicon (LTPS). In this case, a CMOS circuit-based driving circuit, an SRAM circuit, a D/A converter, an image display unit, and the like can be packed integrally on a glass substrate. Accordingly, a voice processing circuit and an LCD having a microprocessor may be formed of LIPS. Since a liquid crystal display panel and its peripheral driving circuits can be formed integrally on a glass substrate, the electrical reliability is improved. That is, since the number of electric connections between the liquid crystal display panel and driving circuits can be reduced significantly and vibration resistance and weight reduction are achieved, the display device becomes preferable for mobile information terminals. In addition, since the current driving capability is high, it is possible to manufacture an LCD including pixels having high resolution and pixels having a high aperture ratio.

The manufacturing method for LTPS will be described below. First, an amorphous silicon film is formed on a glass substrate using a plasma CVD (Chemical Vapor Deposition) method. Next, the amorphous silicon film is irradiated with excimer laser light by setting the temperature of the glass substrate to 450° C. or less to form a polycrystalline silicon film. It is possible to use an excimer laser device which resonates ultraviolet light absorbed significantly by an amorphous silicon film by using, for example, ArF (wavelength of 193 nm), KrF (wavelength of 248 nm), or the like as the gas laser light source. The amorphous silicon film is irradiated with pulse laser light having a laser resonance frequency of approximately 300 Hz, a laser light energy of approximately 300 W, a pulse width of approximately 20 ns to approximately 60 ns, and an irradiation energy density of approximately 500 mJ/cm$^2$ to 1 J/cm$^2$ to melt the amorphous silicon film instantaneously and then the amorphous silicon film is solidified by supercooling. As a result, the amorphous silicon film changes to a polycrystalline silicon film having an average particle diameter of approximately 0.3 µm.

In addition, pixel electrodes having translucency can be formed of a conductive material having translucency, such as indium tin oxide (ITO), indium zinc oxide (IZO), silicon oxide-added indium tin oxide (ITSO), zinc oxide (ZnO), silicon (Si) including phosphorus or boron.

As display devices disposed in the pixel electrode parts, display devices such as LCD devices, organic EL (Electro Luminescence) devices, inorganic EL devices, and PDP (Plasma Display) devices can be used. In addition, when the dot matrix display device according to the invention is an LCD, a TN (Twisted Nematic) type, an in-plane switching (IPS) type, a fringe field switching (FFS) type, or the like can be adopted. For an IPS type LCD or an FFS type LCD, by forming a common electrode for each pixel electrode part on the main surface of an array side substrate (substrate on which TFT elements are formed) on which pixel electrodes are formed, the common voltage can be controlled independently for each pixel electrode part.

INDUSTRIAL APPLICABILITY

In addition, the dot matrix display device according to the invention is applicable to various types of electronic units.

Examples of these electronic units include a digital display wristwatch such as a smartwatch, an automobile route guidance system (car navigation system), a ship route guidance system, an aircraft route guidance system, a smartphone terminal, a mobile phone, a tablet terminal, a personal digital assistant (PDA), a video camera, a digital still camera, an electronic databook, an electronic book, an electronic dictionary, a personal computer, a duplicating machine, a game terminal, a television, a product indication tag, a price indication tag, a programmable display device for industrial use, a car audio device, a head-up display, a digital audio player, a facsimile, a printer, a copying machine, an automated teller machine (ATM), an automatic dispenser, and a head mounted display device (HMD).

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

REFERENCE SIGNS LIST

1: Gate signal line
2: Source signal line
3: Source signal line selection line
4, 100: Pixel electrode part
5: Pixel redraw control unit
5a: Input part
5b1, 5b2, 5b3: Output part
6: Signal supply unit
7: Common voltage line
10: Display unit
11: Dot matrix display device
12: Gate decoder circuit
13: Source decoder circuit
13a: AND element
14: Source signal line selector circuit
15: Clock generation circuit
16: Address generation circuit
17: Image signal generation circuit
18: Control signal generation circuit
19: Parallel-to-serial conversion circuit
20: Clock control unit
21: Address control circuit
22: Shift register circuit
23: Address computation circuit
24: Data register circuit
101: TFT element
102: Common voltage line
103: Gate signal line driving circuit
104: Source signal line driving circuit
110: Display unit
111: LCD panel
161: Input part
161a: First n-channel TFT element close to a source signal line
161b: Second n-channel TFT element close to a gate signal line
162: Holding circuit
162a: First CMOS inverter
162b: Second CMOS inverter
163: Pixel electrode control circuit
164: Drive selection circuit
181: First binary selection circuit
181a: P-channel TFT element
181b: N-channel TFT element
182: Second binary selection circuit
182a: P-channel TFT element
182b: N-channel TFT element
190: Display panel
191: Display area for displaying hours
192: Display area for displaying minutes
193: Display area for displaying seconds
194: Display area for displaying a still picture
195: Digital display wristwatch

The invention claimed is:

1. A dot matrix display device, comprising:
a plurality of gate signal lines disposed in one direction;
a plurality of source signal lines disposed in another direction intersecting the one direction;
a display unit having a plurality of pixel electrode parts disposed in a matrix, the plurality of pixel electrode parts controlling display, a part of the plurality of pixel electrode parts being selected based on the gate signal lines and the source signal lines;
a pixel redraw control unit which generates gate selection signals identifying addresses in the one direction, source selection signals identifying addresses in the another direction intersecting the one direction, and image data which correspond to one or more of the pixel electrode parts based on a serial signal including address signals identifying addresses of the one or more of the pixel electrode parts and image signals supplied to the one or more of the pixel electrode parts; and
a decoder unit that generates a gate signal which activates the gate signal lines corresponding to the one or more of the pixel electrode parts based on the gate selection signals generated by the pixel redraw control unit, generates a source signal which activates the source signal lines corresponding to the one or more of the pixel electrode parts based on the source selection signals generated by the pixel redraw control unit, and supplies the image data generated by the pixel redraw control unit to the pixel electrode parts corresponding to the activated source signal lines.

2. The dot matrix display device according to claim 1, further comprising:
a signal supply unit which generates the serial signal including the address signal and the image signal based on a video signal supplied from an outside and a control signal defining timing concerning processing of the image signal in the serial signal and outputs the serial signal and the control signal to the pixel redraw control unit.

3. The dot matrix display device according to claim 2, wherein the pixel redraw control unit includes an address computation circuit which generates the gate selection signals and the source selection signals corresponding to the one or more of the pixel electrode parts based on the serial signal and the control signal inputted from the signal supply unit, and
a data register circuit which generates the image data to be supplied to the one or more of the pixel electrode parts based on the serial signal and the control signal inputted from the signal supply unit.

4. The dot matrix display device according to claim 3, wherein, if the pixel electrode parts on which redraw driving is executed are continuous in the one direction, the address computation circuit generates the source selection signals corresponding to the plurality of pixel electrode parts based on one source address signal.

5. The dot matrix display device according to claim 3, wherein, if the pixel electrode parts on which redraw driving is executed are continuous in the another direction intersecting the one direction, the address computation circuit generates the gate selection signals corresponding to the plurality of pixel electrode parts based on one gate address signal.

6. The dot matrix display device according to claim 3, wherein, if the pixel electrode parts on which redraw driving is executed are continuous in the one direction and the another direction intersecting the one direction, the address computation circuit generates the source selection signals and the gate selection signals corresponding to the plurality of pixel electrode parts based on one source address signal and one gate address signal, respectively.

7. The dot matrix display device according to claim 2, wherein the signal supply unit generates only a serial signal concerning the one or more of the pixel electrode parts on which redraw driving of the image data is executed based on the video signal and outputs the generated serial signal to the pixel redraw control unit.

8. A time display device comprising:
the dot matrix display device according to claim 2; and
a clock control unit which clocks time, generates at least a video signal concerning display of clocked time, and outputs the video signal to the signal supply unit.

9. The dot matrix display device according to claim 1, wherein each of the pixel electrode parts includes
a holding circuit which holds the supplied image data, and
a drive selection circuit which selects executing either redraw driving or still picture driving based on the generated gate signals and the generated source signals, and
the image data in the holding circuit is redrawn using the supplied image data when the redraw driving is selected, and
the image data held in the holding circuit continues to be held when the still picture driving is selected.

* * * * *

UNITED STATES PATENT AND TRADEMARK OFFICE
CERTIFICATE OF CORRECTION

PATENT NO. : 10,847,104 B2  
APPLICATION NO. : 16/089638  
DATED : November 24, 2020  
INVENTOR(S) : Tomoo Kasuo, Eiji Yamakawa and Takanobu Suzuki Page 1 of 1

It is certified that error appears in the above-identified patent and that said Letters Patent is hereby corrected as shown below:

On the Title Page

At item (73), just below "Kyocera Corporation, Kyoto (JP)", please insert --CASIO COMPUTER CO., LTD., Tokyo (JP)--.

Signed and Sealed this  
Tenth Day of August, 2021

Drew Hirshfeld  
*Performing the Functions and Duties of the  
Under Secretary of Commerce for Intellectual Property and  
Director of the United States Patent and Trademark Office*